US007735086B2

(12) United States Patent
Hellerstein et al.

(10) Patent No.: US 7,735,086 B2
(45) Date of Patent: Jun. 8, 2010

(54) METHODS AND ARRANGEMENTS FOR PLANNING AND SCHEDULING CHANGE MANAGEMENT REQUESTS IN COMPUTING SYSTEMS

(75) Inventors: Joseph L. Hellerstein, Ossining, NY (US); Alexander Keller, New York, NY (US); Vijaya Krishnan, Stamford, CT (US); Joel L. Wolf, Katonah, NY (US); Kun-Lung Wu, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 1306 days.

(21) Appl. No.: 10/789,099

(22) Filed: Feb. 27, 2004

(65) Prior Publication Data

US 2005/0204358 A1    Sep. 15, 2005

(51) Int. Cl.
*G06F 9/46* (2006.01)
(52) U.S. Cl. ..................................... 718/105
(58) Field of Classification Search .................. 718/102
See application file for complete search history.

(56) References Cited

U.S. PATENT DOCUMENTS

| 6,314,463 | B1 * | 11/2001 | Abbott et al. ............... 709/224 |
| 6,415,259 | B1 * | 7/2002 | Wolfinger et al. .............. 705/8 |
| 6,456,996 | B1 * | 9/2002 | Crawford et al. ............... 707/1 |
| 2002/0198923 | A1 * | 12/2002 | Hayes, Jr. .................... 709/102 |
| 2004/0111509 | A1 * | 6/2004 | Eilam et al. .................. 709/224 |

OTHER PUBLICATIONS

A Duality Approach to Admission and Scheduling Controls of Queues Susan H. Xu Queuing Systems, Feb. 7, 1994.*
Games, Critical Paths and Assignment Problems in Permutation Flow Shops and Cyclic Scheduling Flow Line Environments Karabati, Kouvelis, Kiran The Journal of the Operational Research Society, Mar. 1992.*
J. Blazewicz, K. Ecker, G. Schmidt, J. Weglarz, Scheduling in Computer and Manufacturing Systems, Springer-Verlag, 1993.
E. Coffman, editor, Computer and Job-Shop Scheduling Theory, John Wiley and Sons, 1976.
M. Pindeo, Scheduling: Theory Algorithms and Systems, Prentice Hall 1995.
E. Lawler, Combinatorial Optimization: Networks and Matroids, Holt, Rinehart and Winston, 1976.
W. Press, B. Flanner, S. Teukolsk, W. Vetterling, Numerical Recipes: The Art of Scientific Computing, Cambridge University Press, 1986.
M. Garey, D. Johnson, Computers & Intractability: A Guide to the Theory of NP-Completeness, W. H. Freeman & Company, 1979.
R. Motwani, P. Raghavan, Randomized Algorithms, Cambridge University Press, 1995.

(Continued)

*Primary Examiner*—Thomas Lee
*Assistant Examiner*—Mengyao Zhe
(74) *Attorney, Agent, or Firm*—Ference & Associates LLC

(57) ABSTRACT

Methods and arrangements for planning and scheduling change management requests in computing systems are disclosed. Included are an arrangement for deciding whether or not an RFC should be done, an arrangement for assigning individual tasks to acceptable servers for each RFC to be done, and an arrangement for assigning the start times to said individual tasks for each RFC to be done.

23 Claims, 35 Drawing Sheets

OTHER PUBLICATIONS

The Institute of Electrical and Electronics Engineers, Inc., 1996, IEEE Standard for Information Technology—Portable Operating System Interface (POSIX) System Administration.

Part 2: Software Administration.

CAE Specification, Systems Management: Distributed Software Administration (XDSA), The Open Group, Jan. 1998.

* cited by examiner

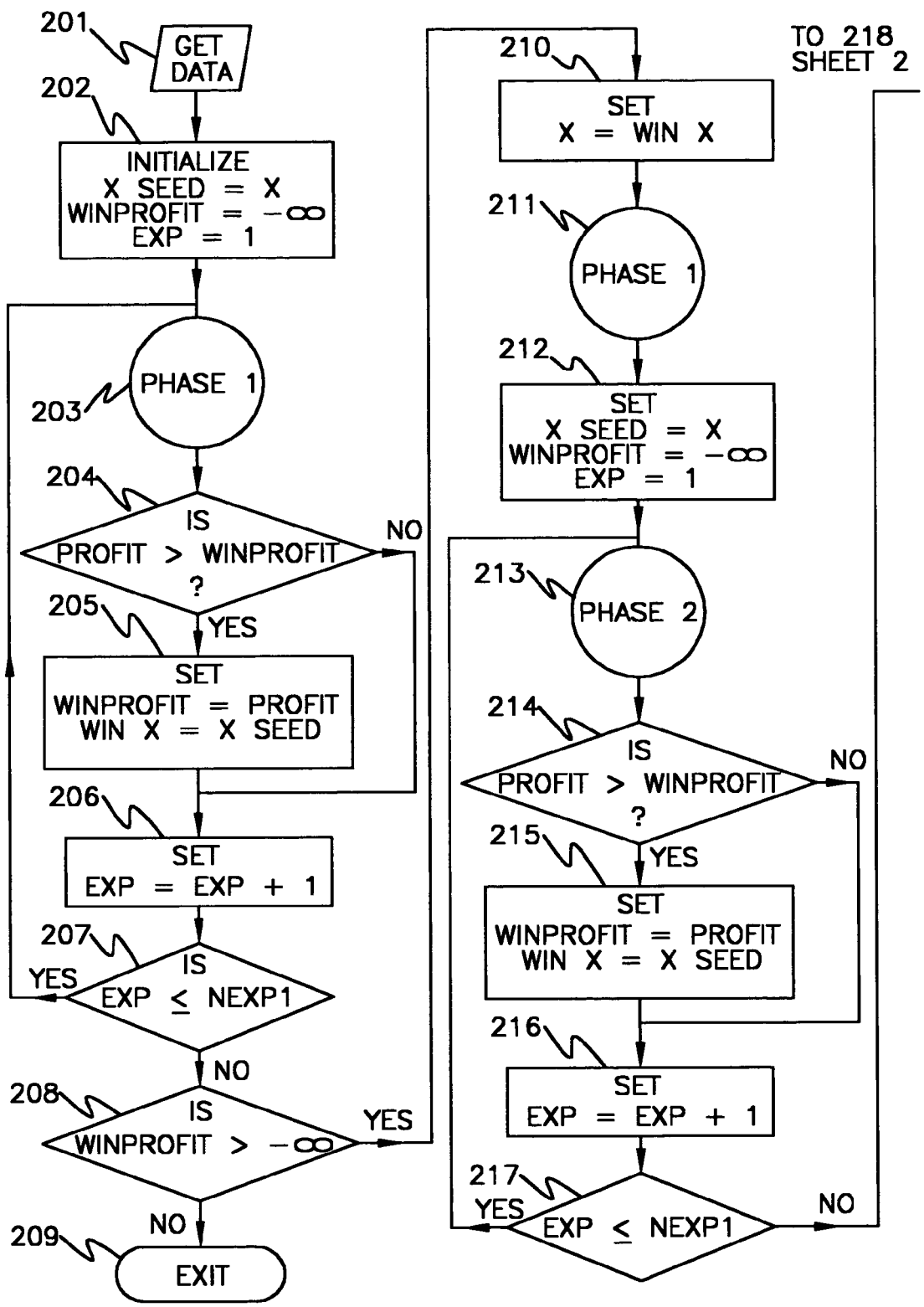
FIG. 2 (SHEET 1)

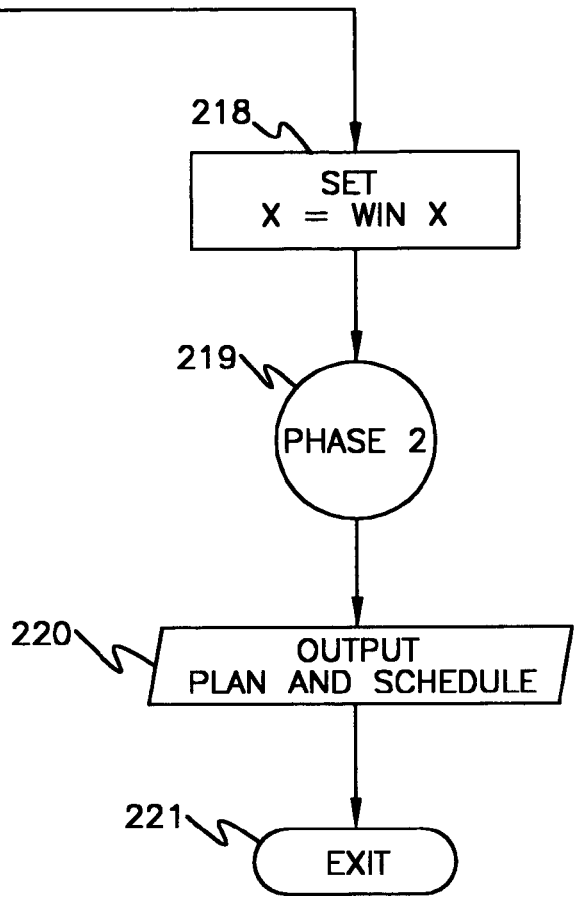
FIG. 2 (SHEET 2)

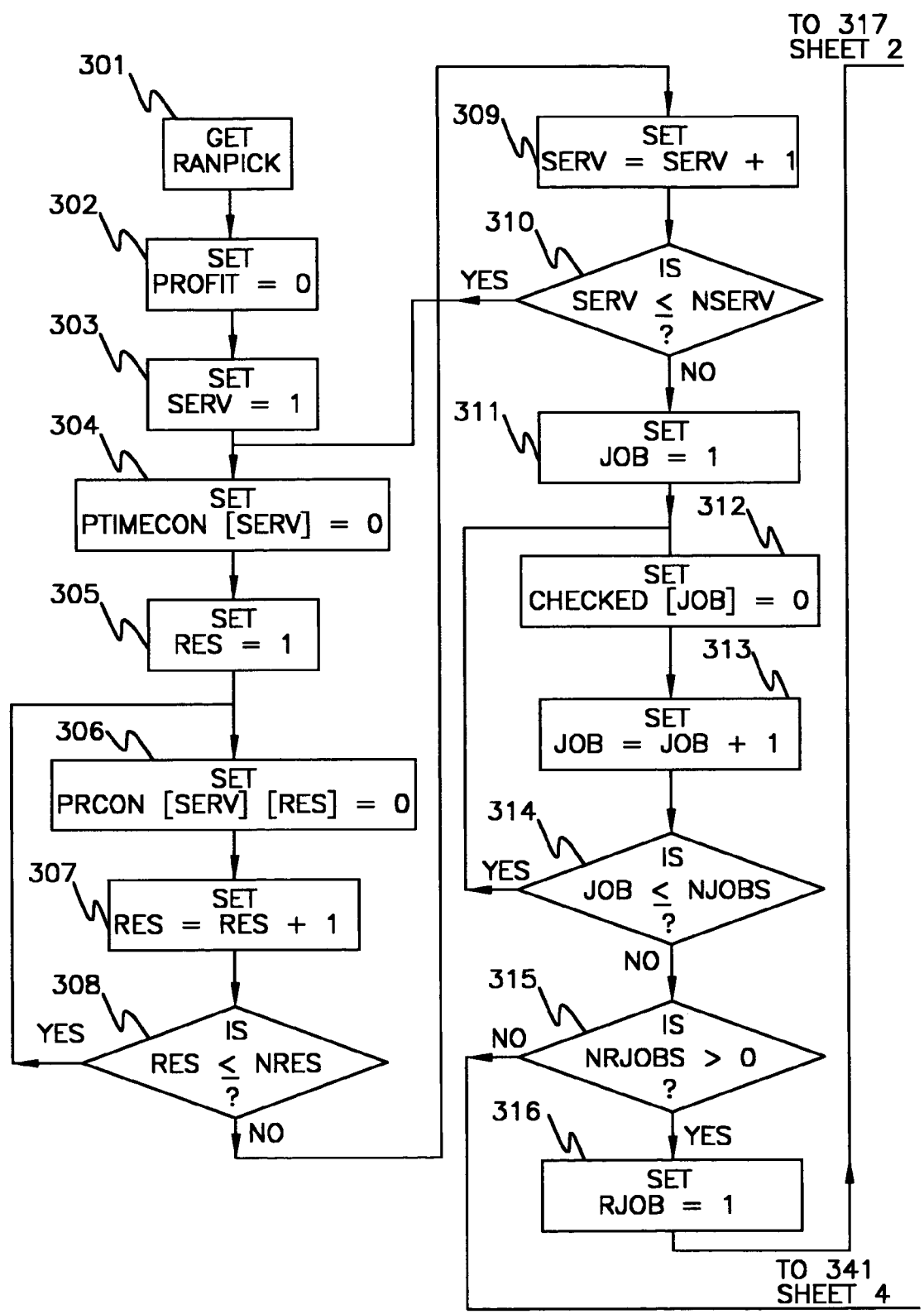
FIG. 3 (SHEET 1)

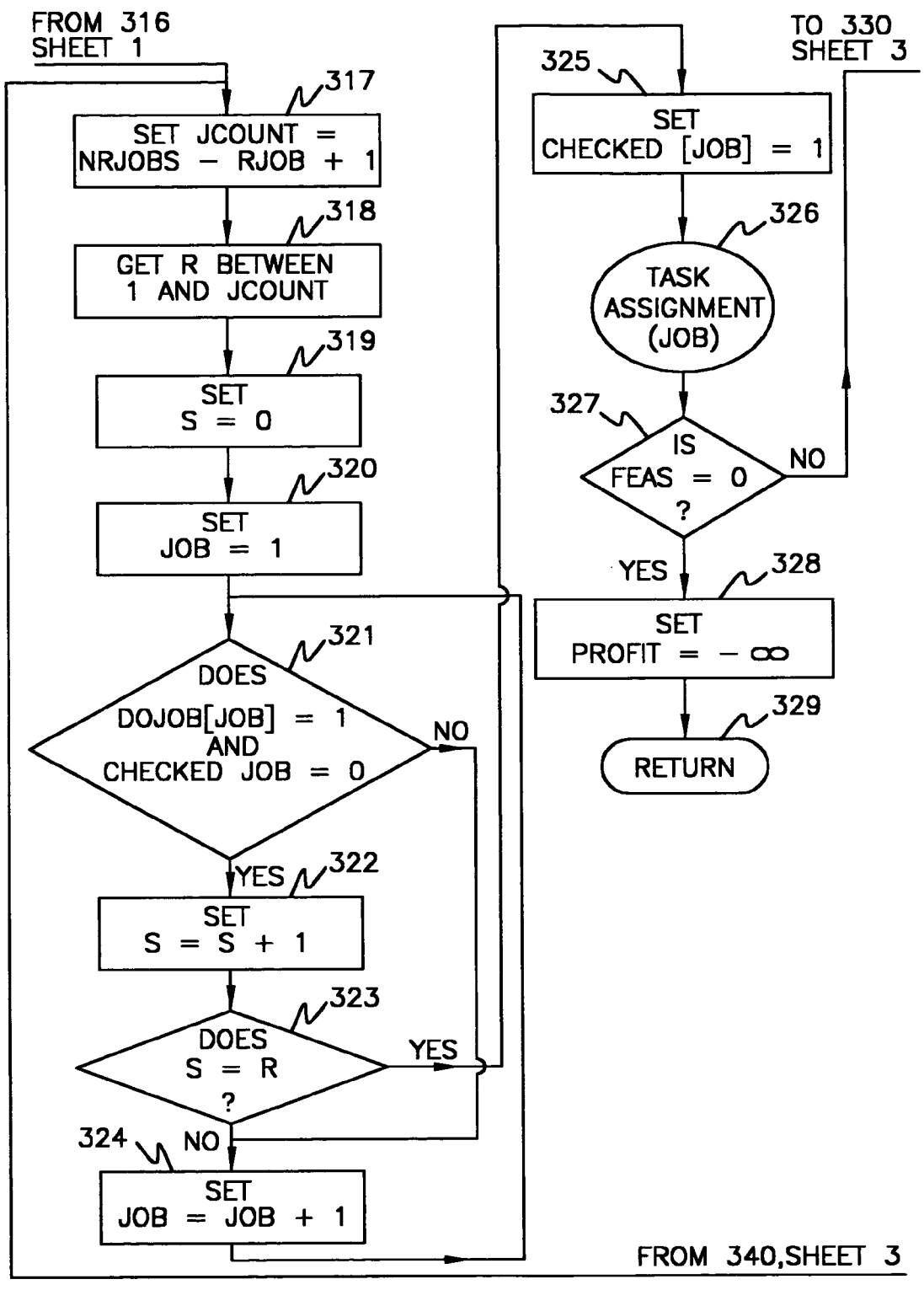
FIG. 3 (SHEET 2)

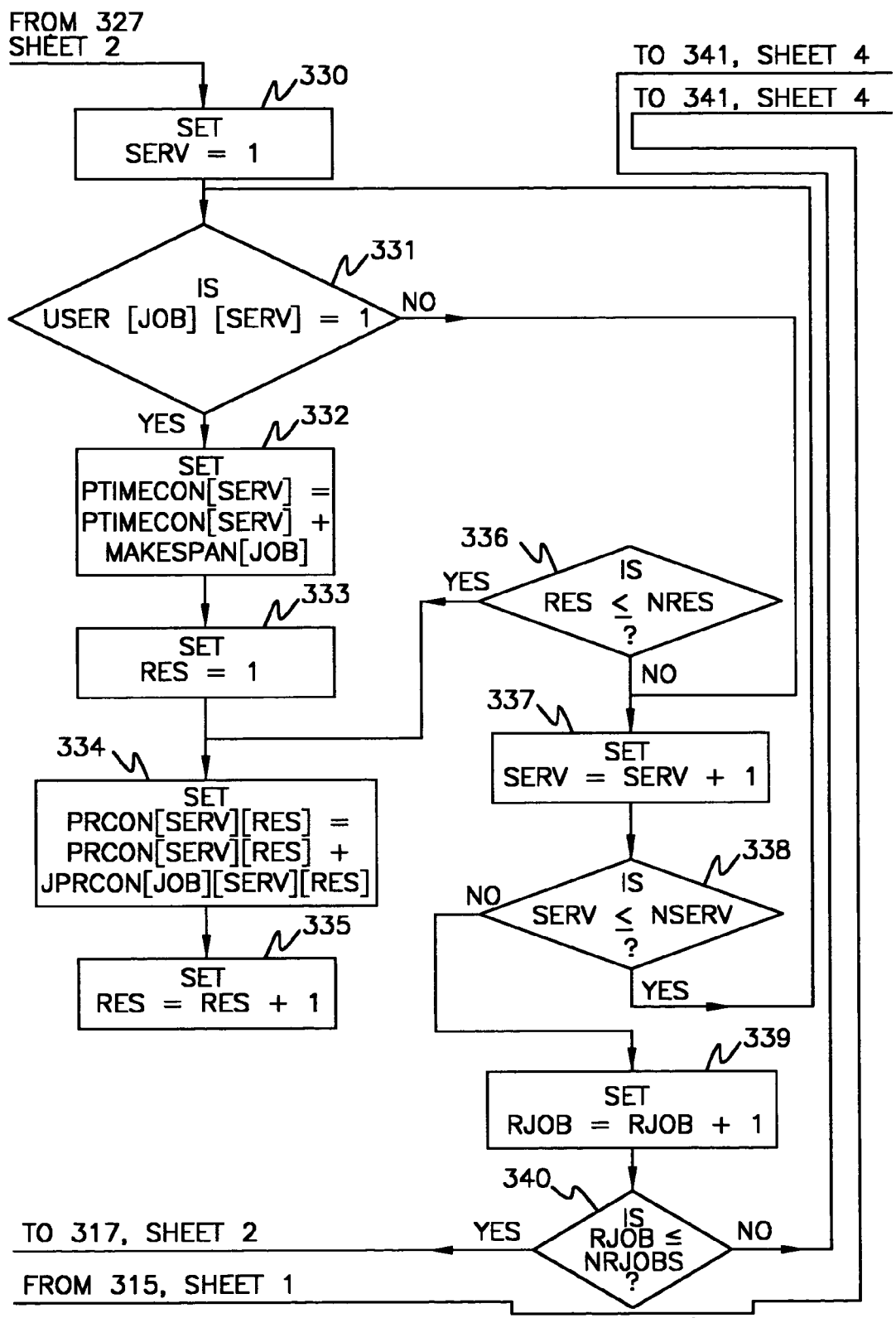
FIG. 3 (SHEET 3)

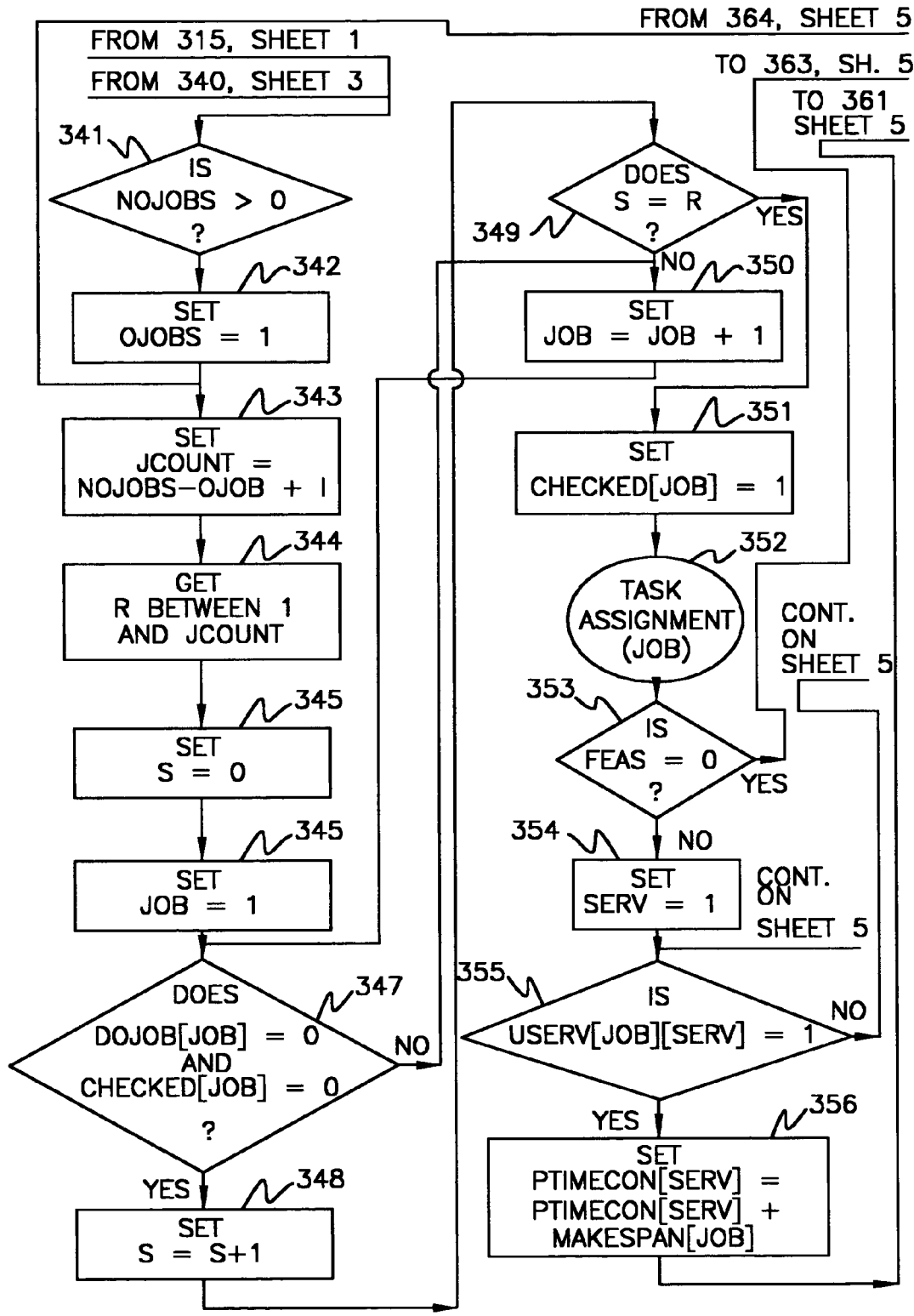
FIG. 3 (SHEET 4)

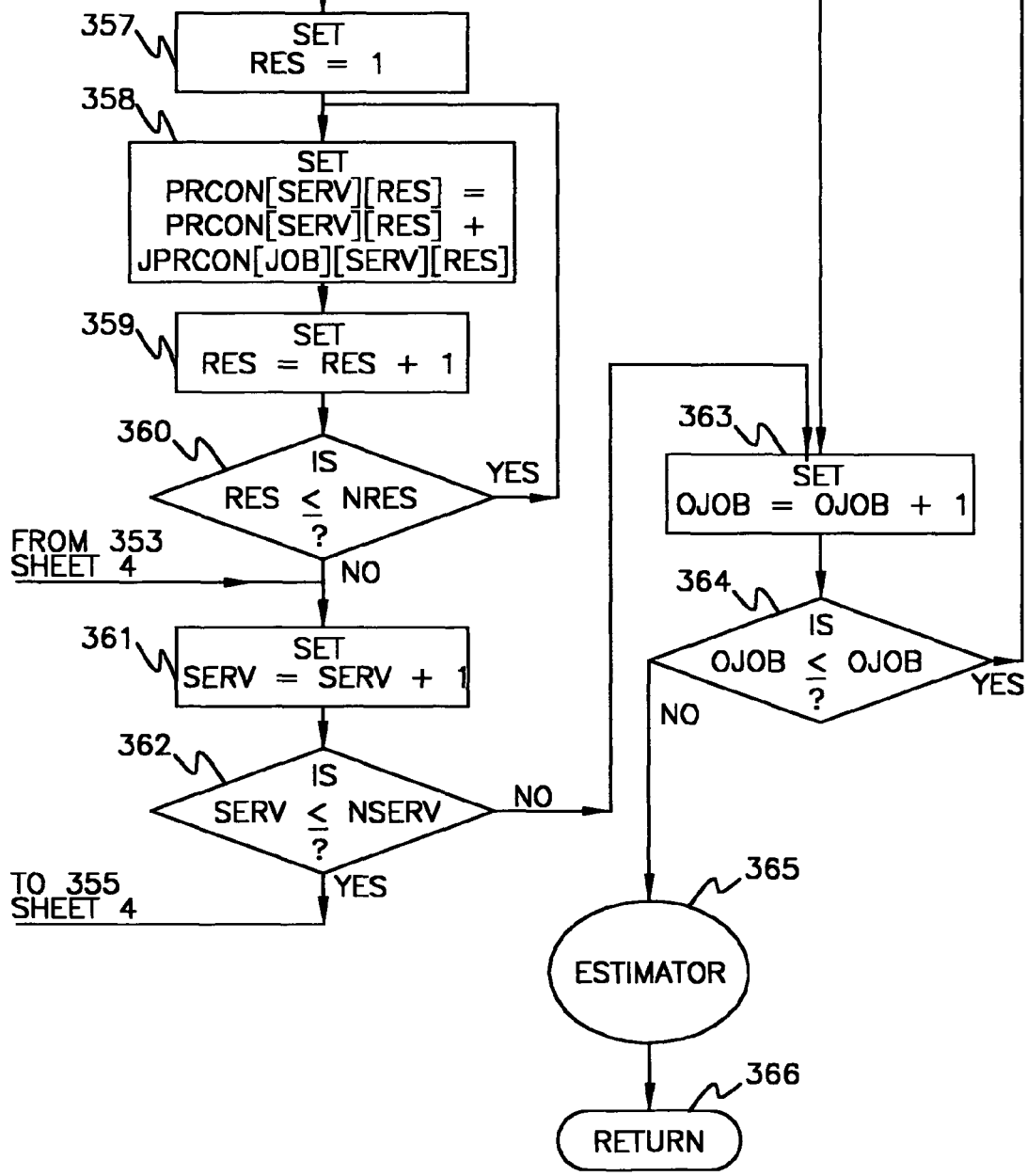
FIG. 3 (SHEET 5)

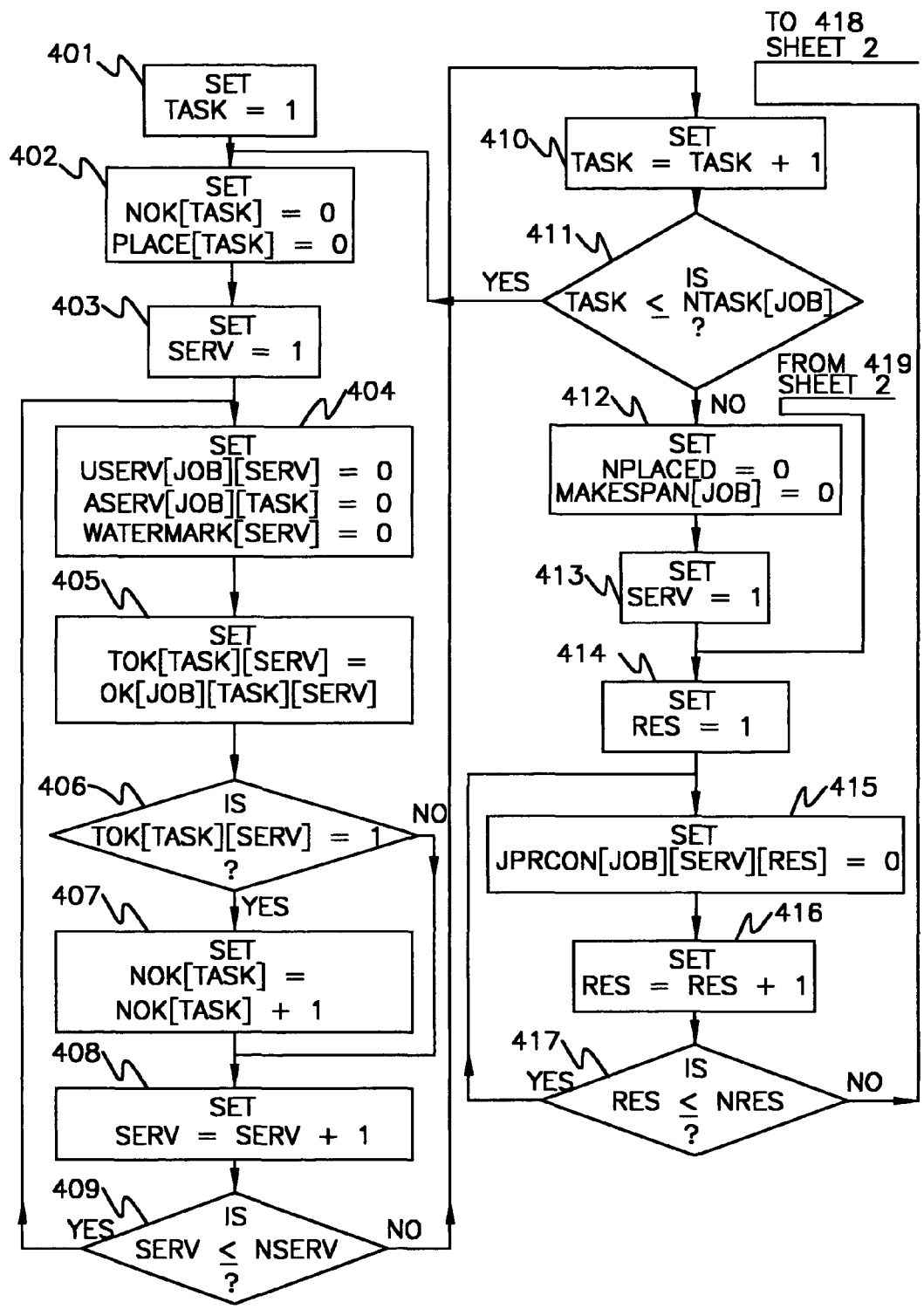
FIG. 4 (SHEET 1)

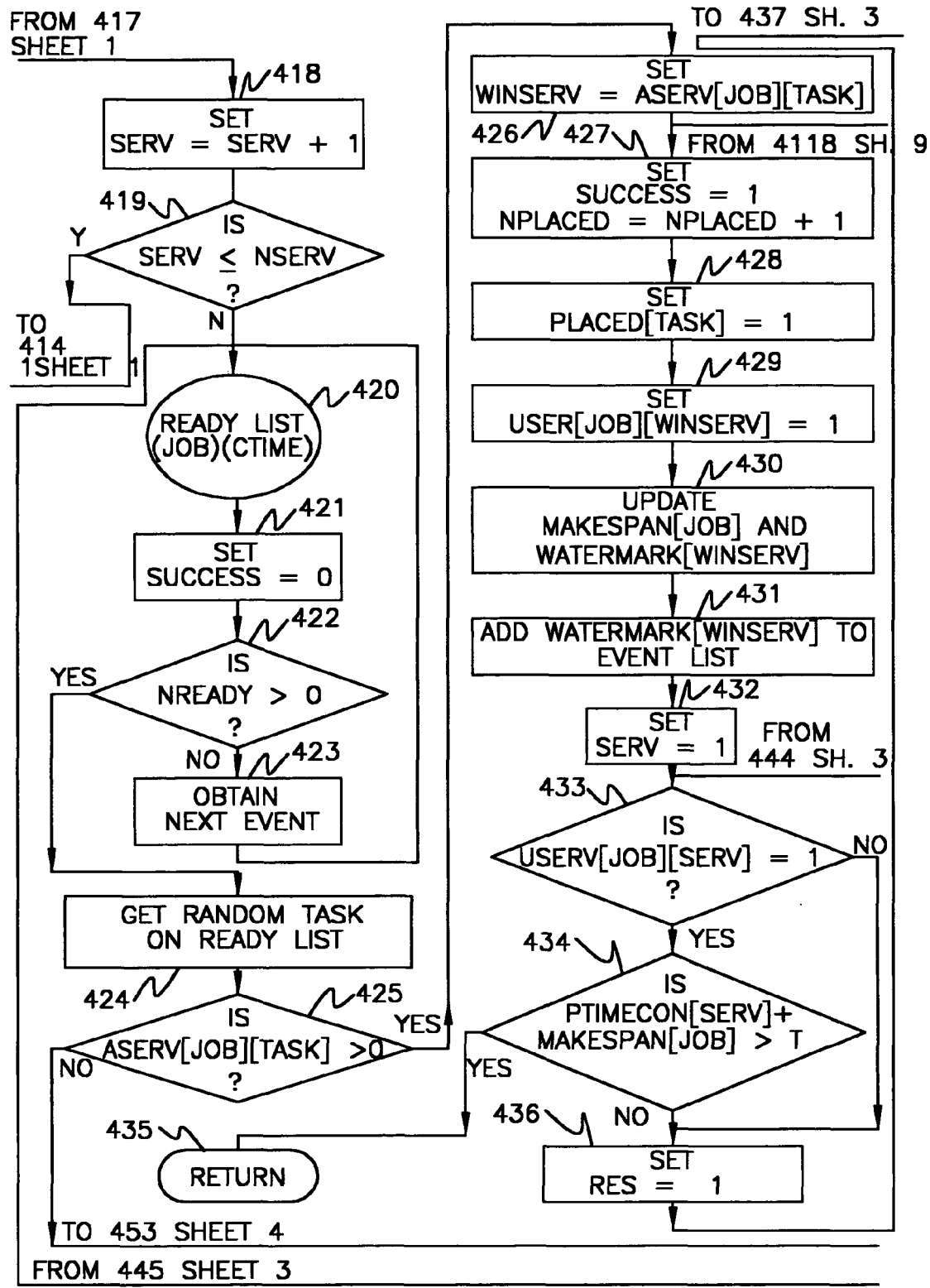
FIG. 4 (SHEET 2)

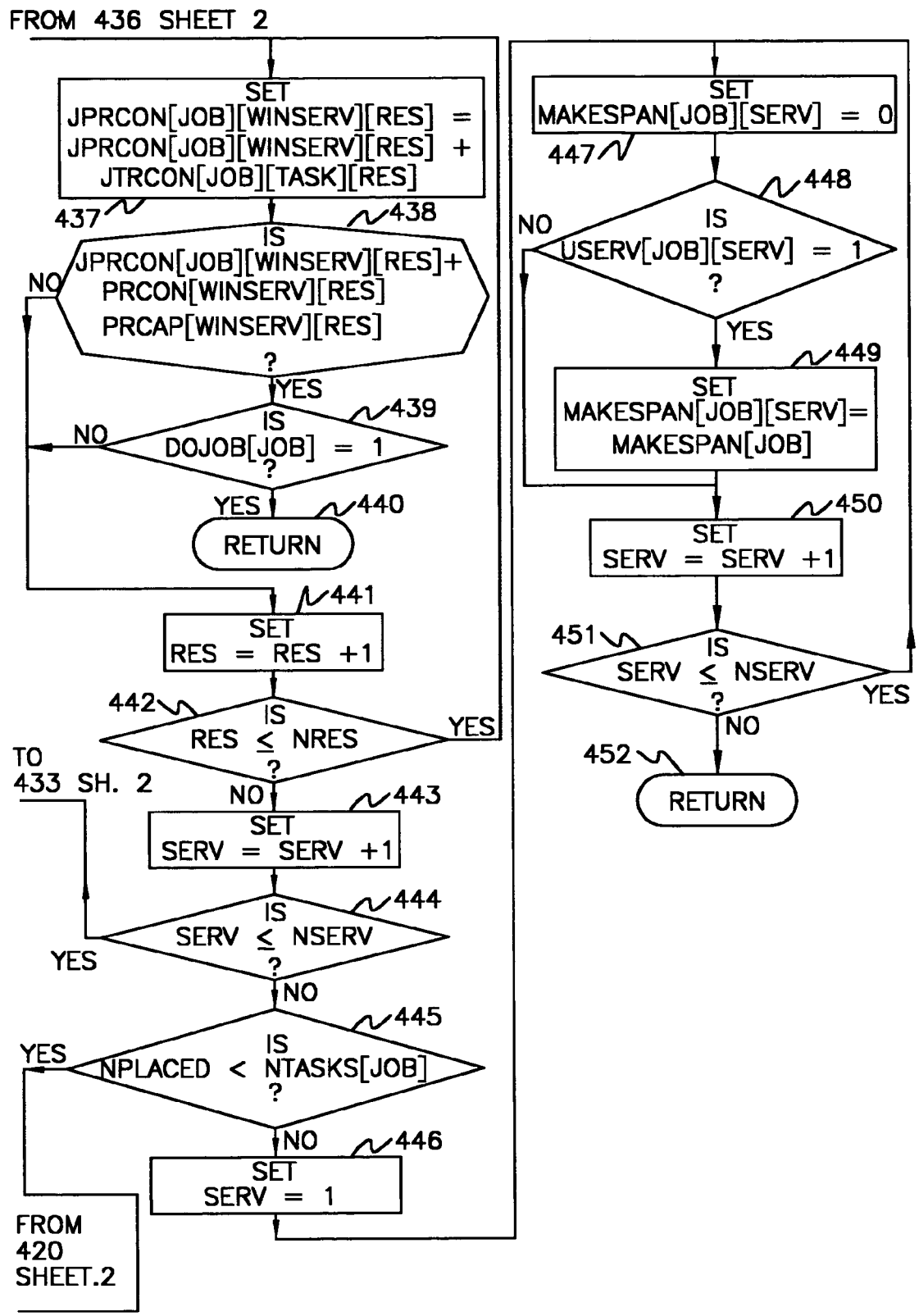
FIG. 4 (SHEET 3)

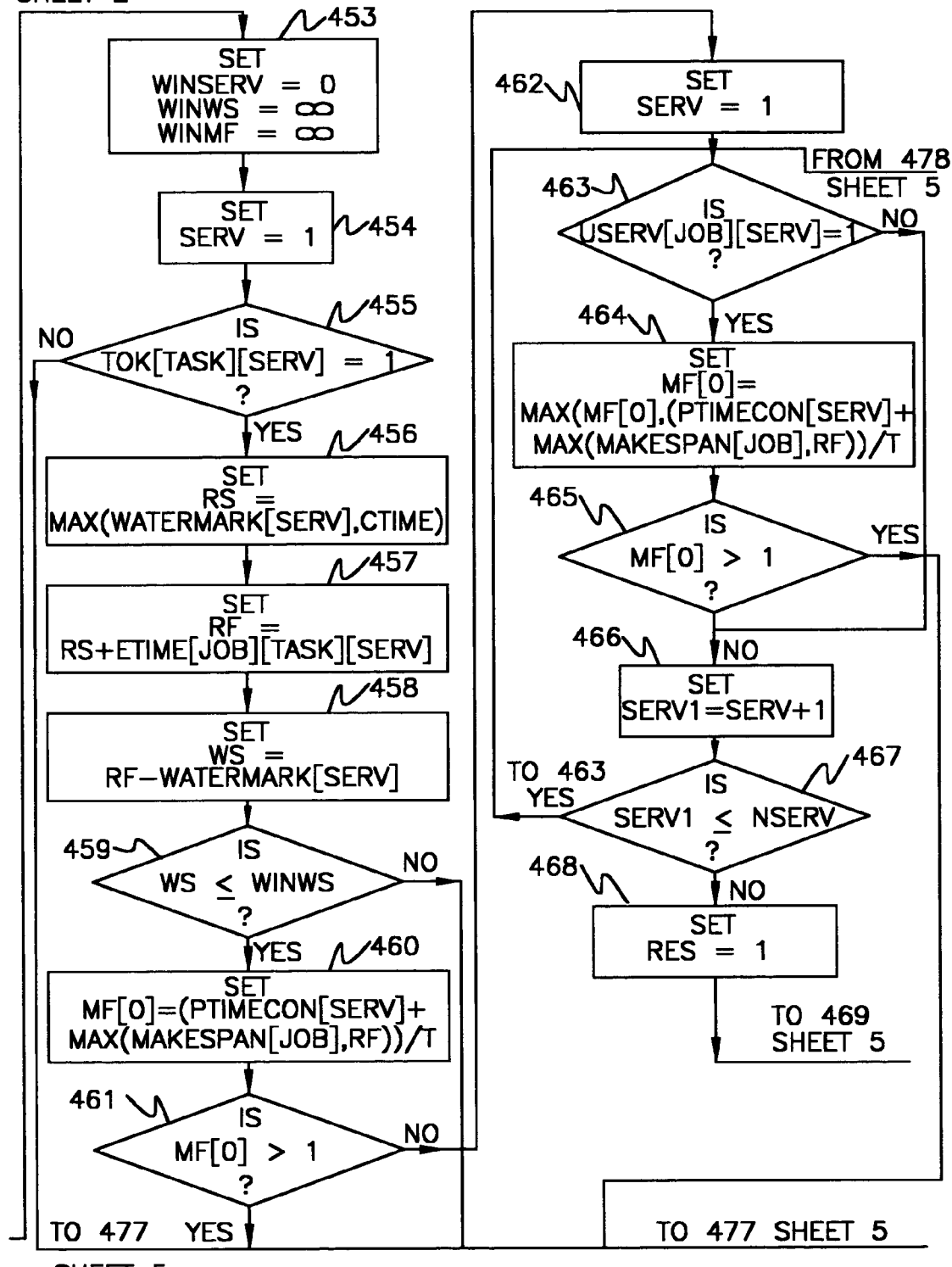
FIG. 4 (SHEET 4)

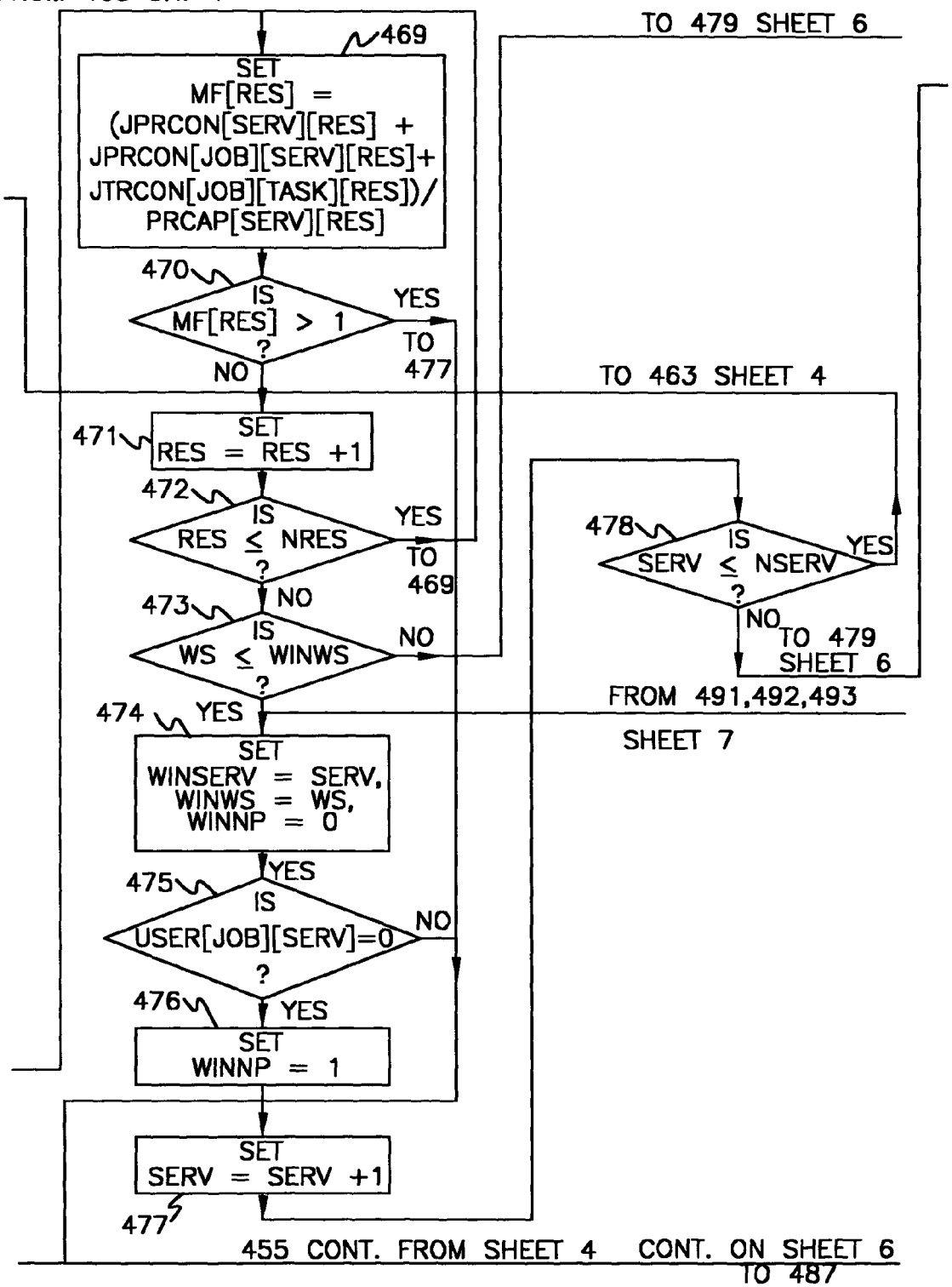
FIG. 4 (SHEET 5)

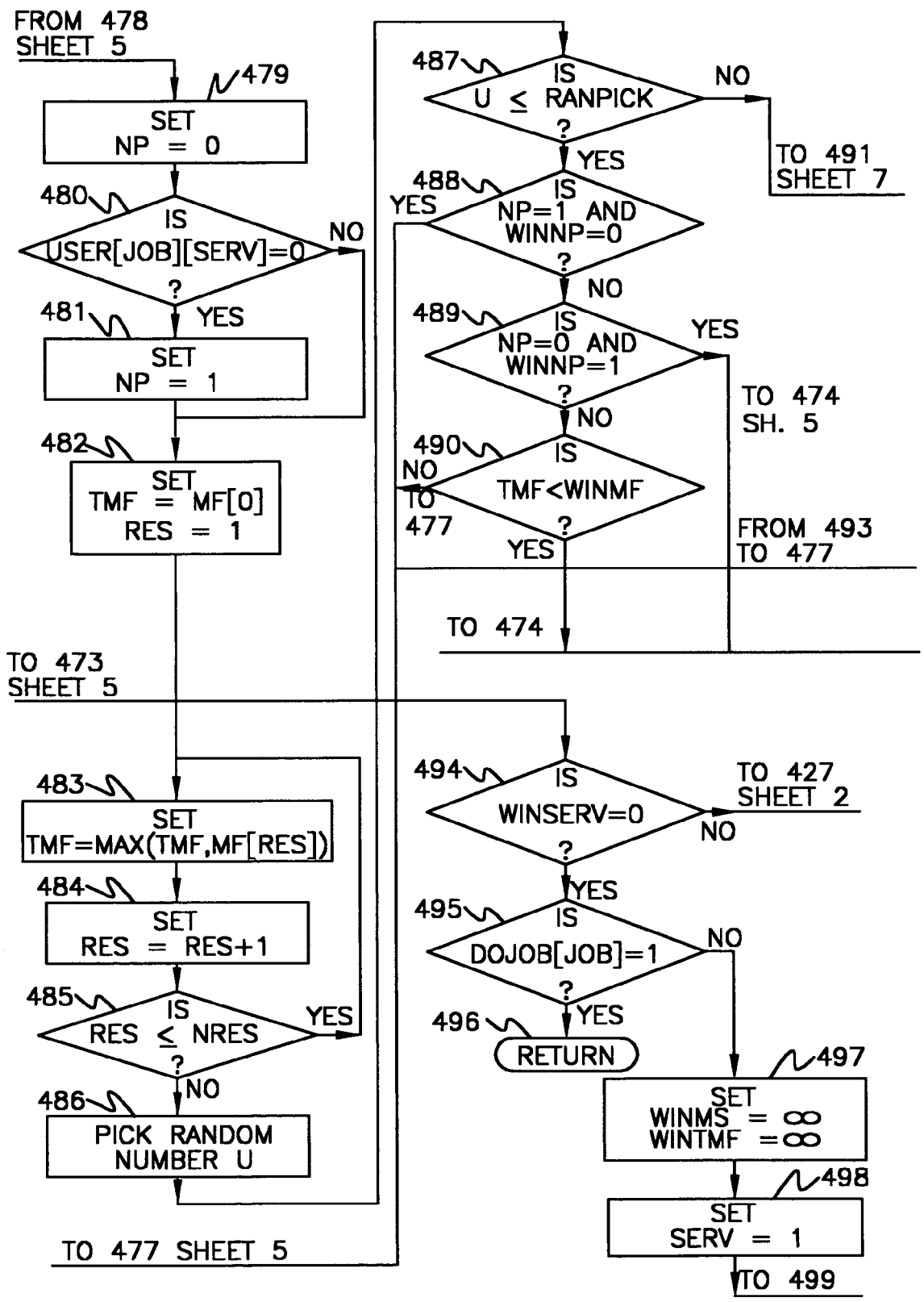
FIG. 4 (SHEET 6)

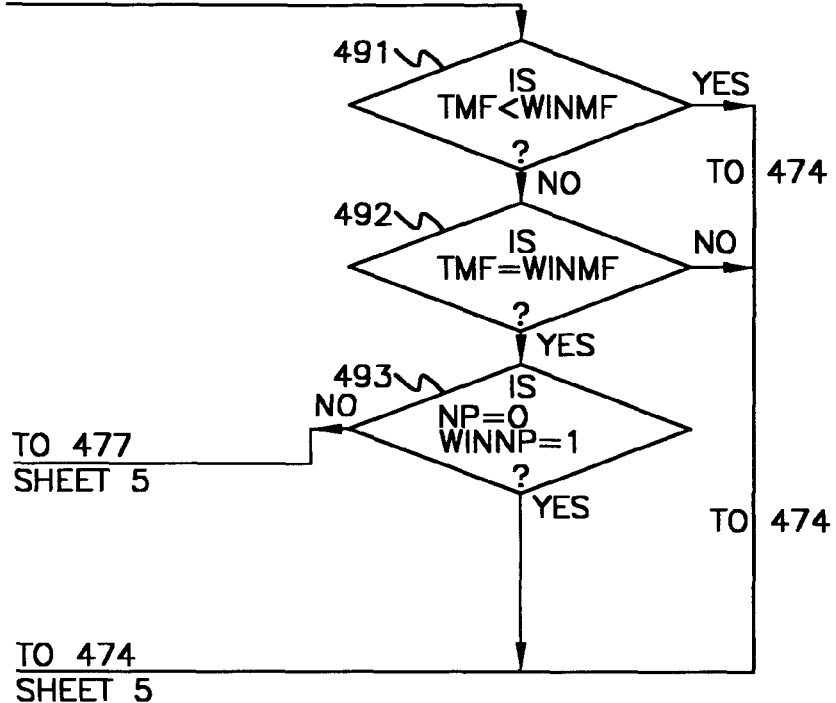
FIG. 4 (SHEET 7)

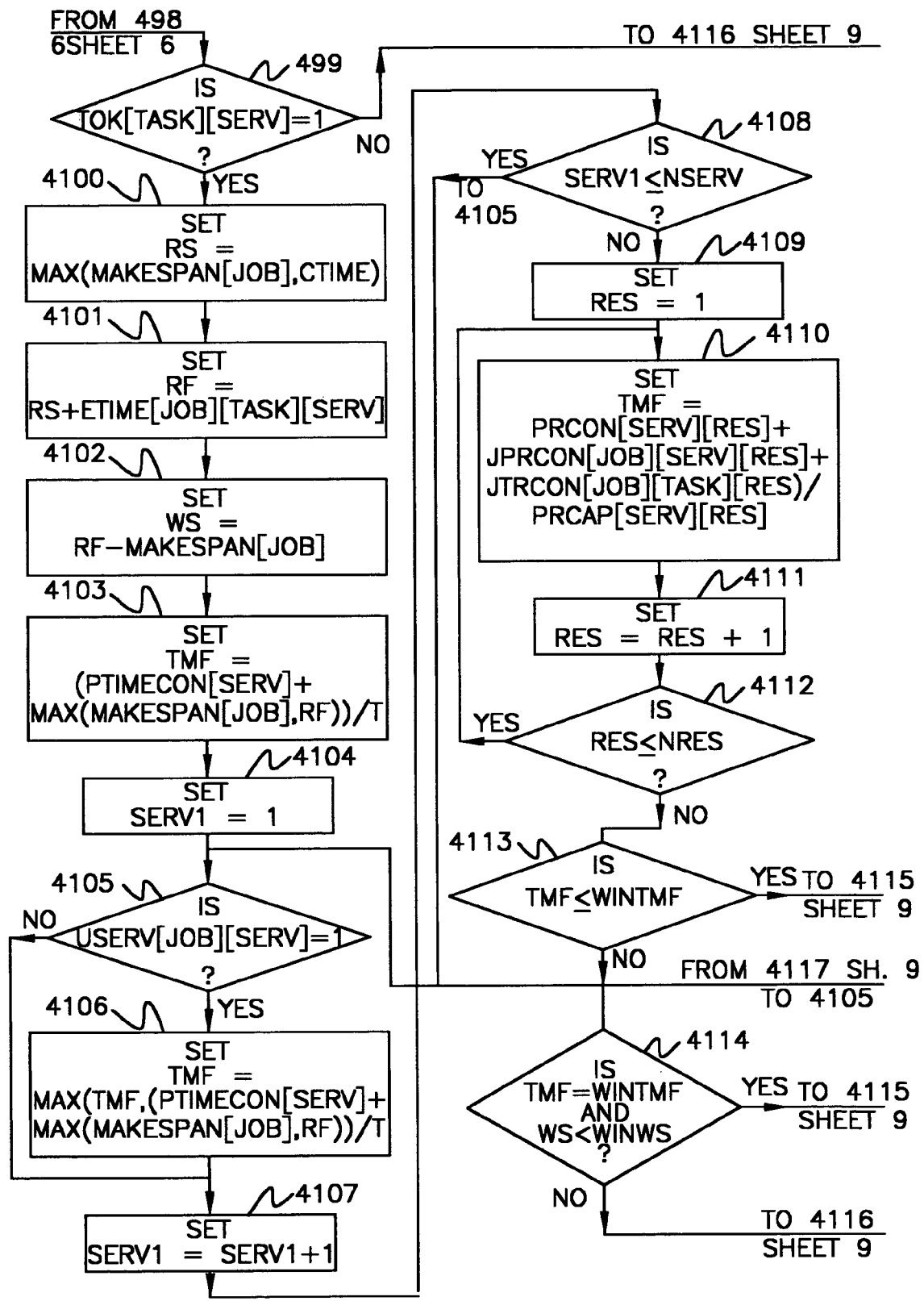
FIG. 4 (SHEET 8)

FROM 499
SHEET 8

TO 427 SHEET 2

FROM 4113 & 4114
SHEET 8

4115
SET
WINSERV = SERV
WINSWS = WS
WINTMF = TMF

4116
SET
SERV = SERV + 1

4117
IS
SERV≤NSERV
?
YES

NO

4118
IS
WINSERV = 0
?
NO

YES

4119
RETURN

TO 4105
SHEET 8

FROM 4114
SHEET 8

FIG. 4 (SHEET 9)

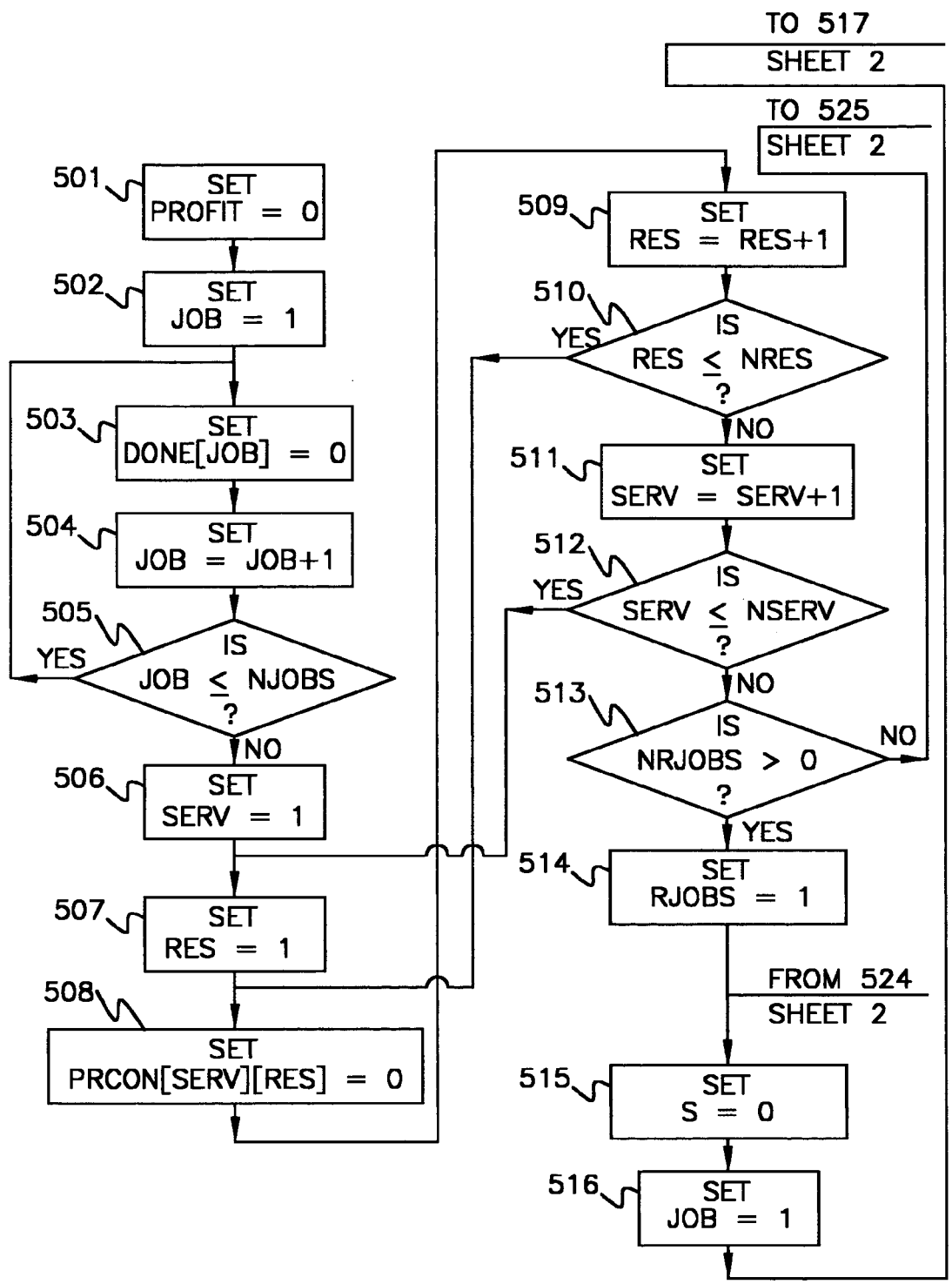
FIG. 5 (SHEET 1)

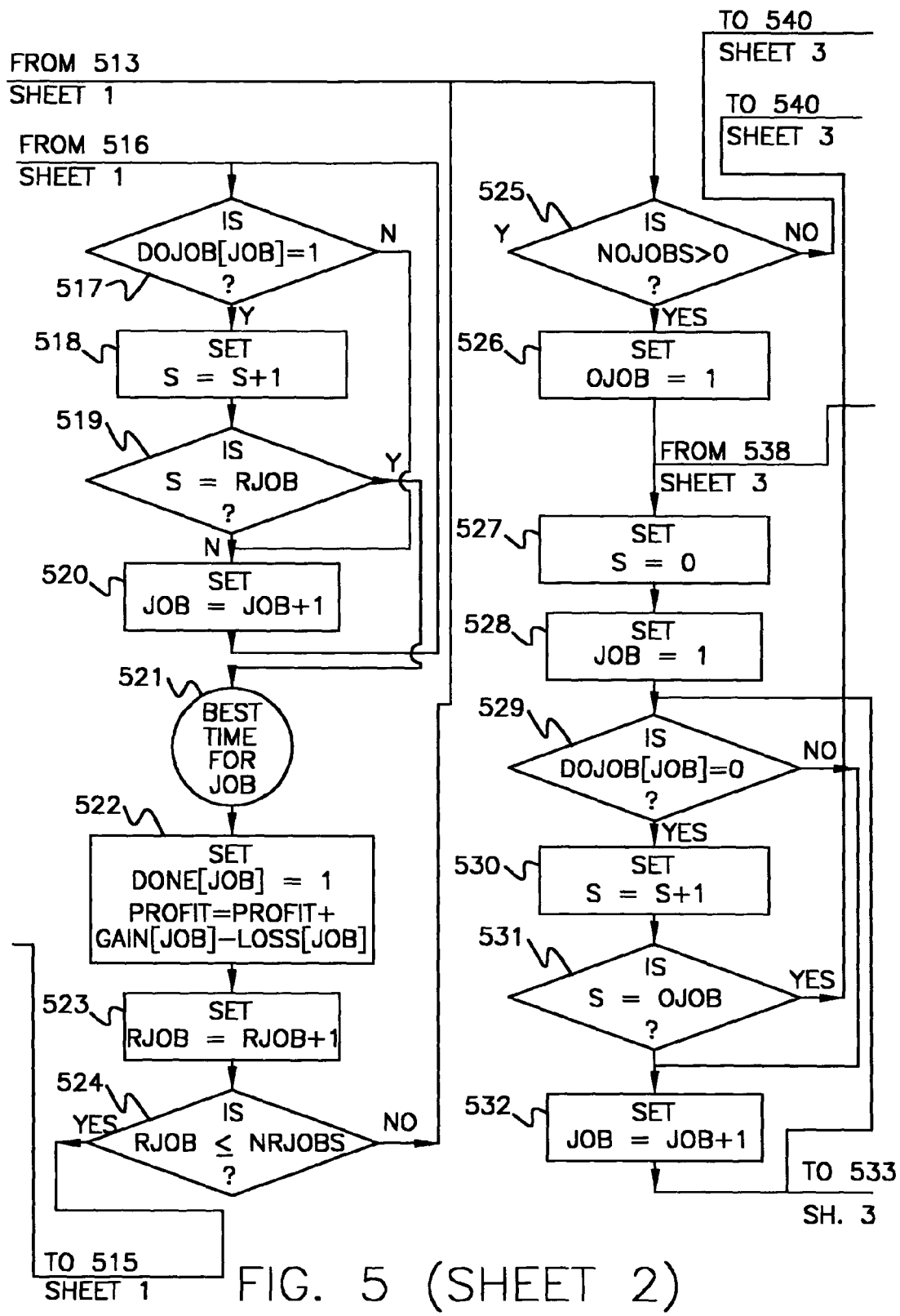
FIG. 5 (SHEET 2)

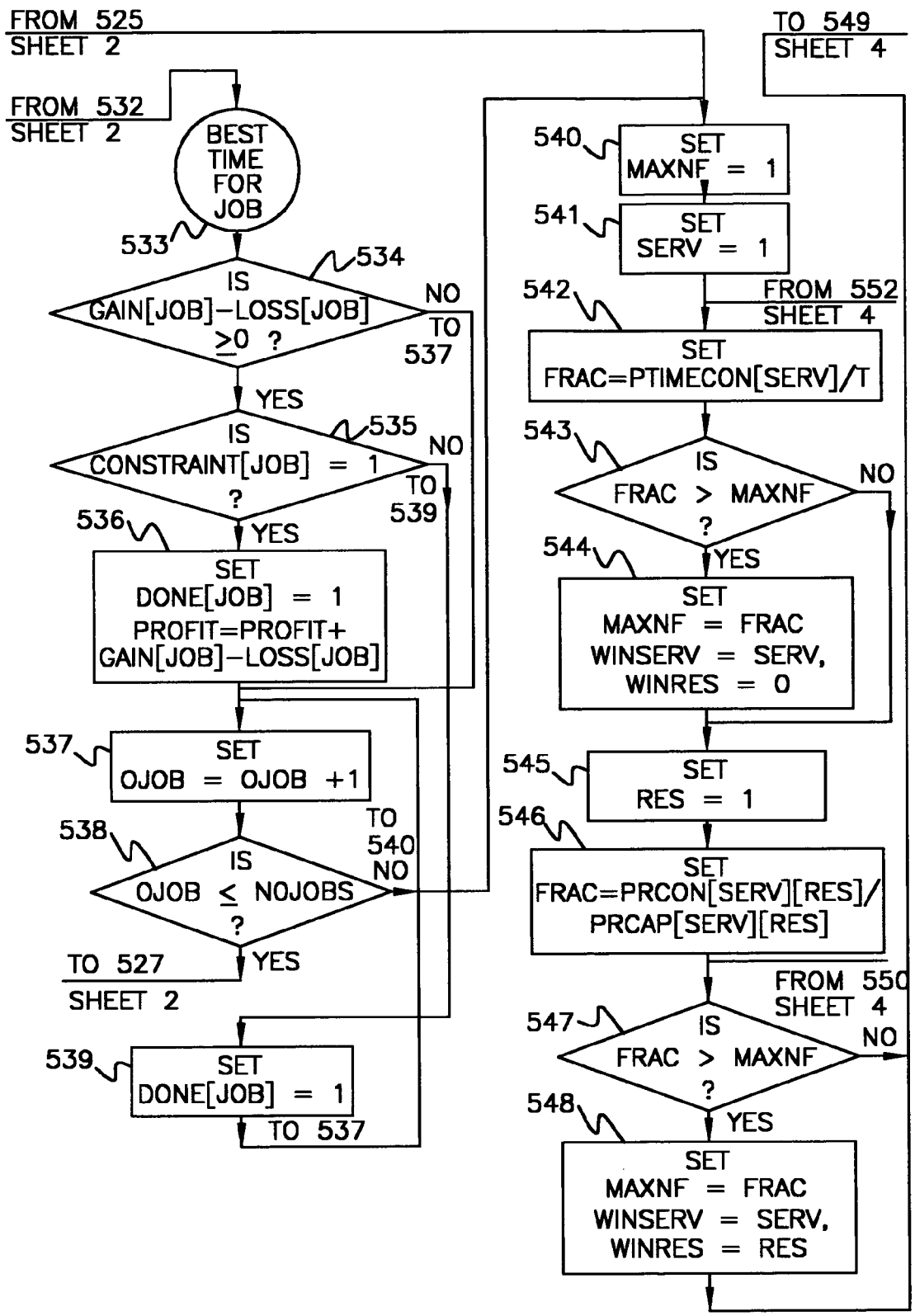
FIG. 5 (SHEET 3)

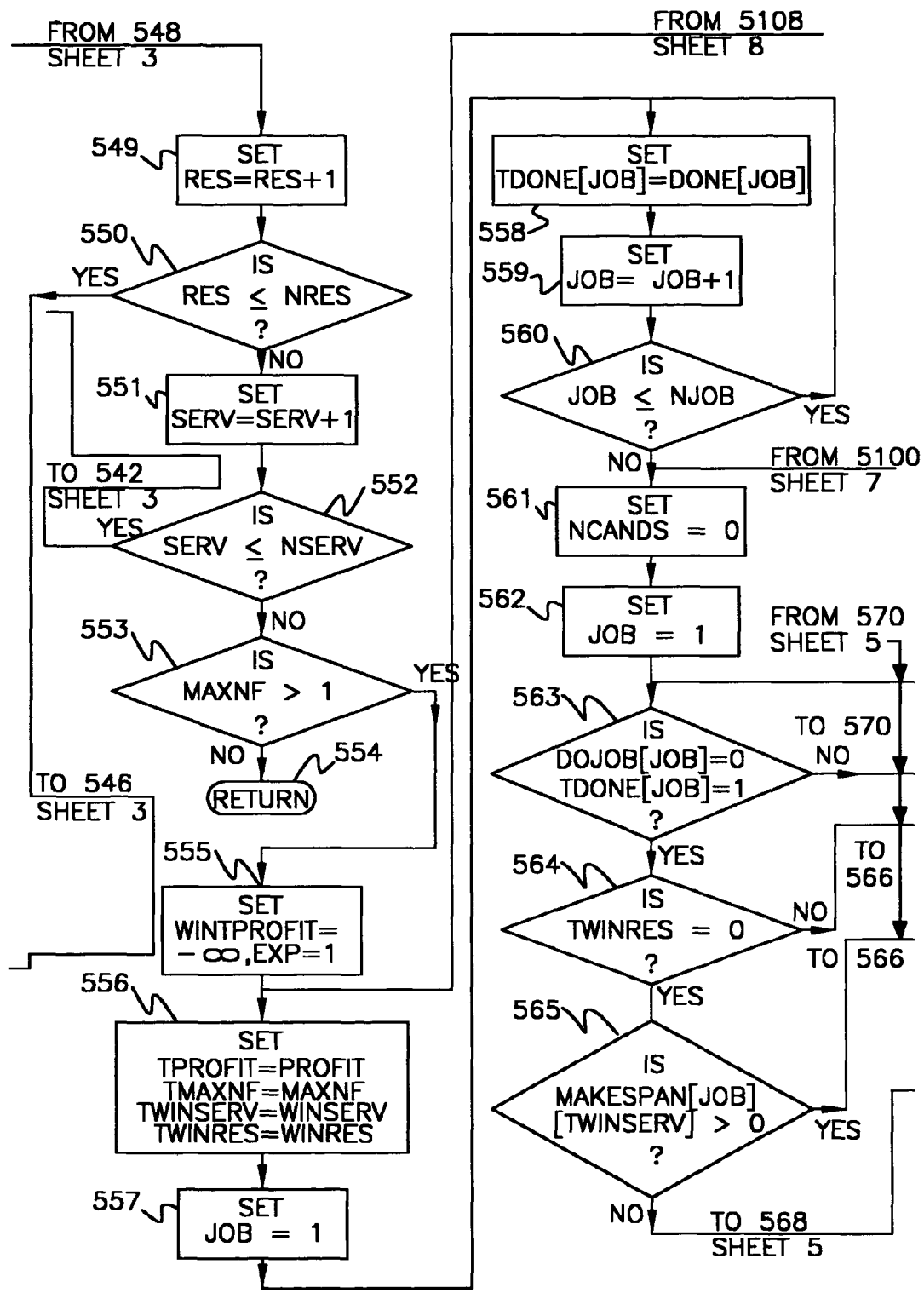
FIG. 5 (SHEET 4)

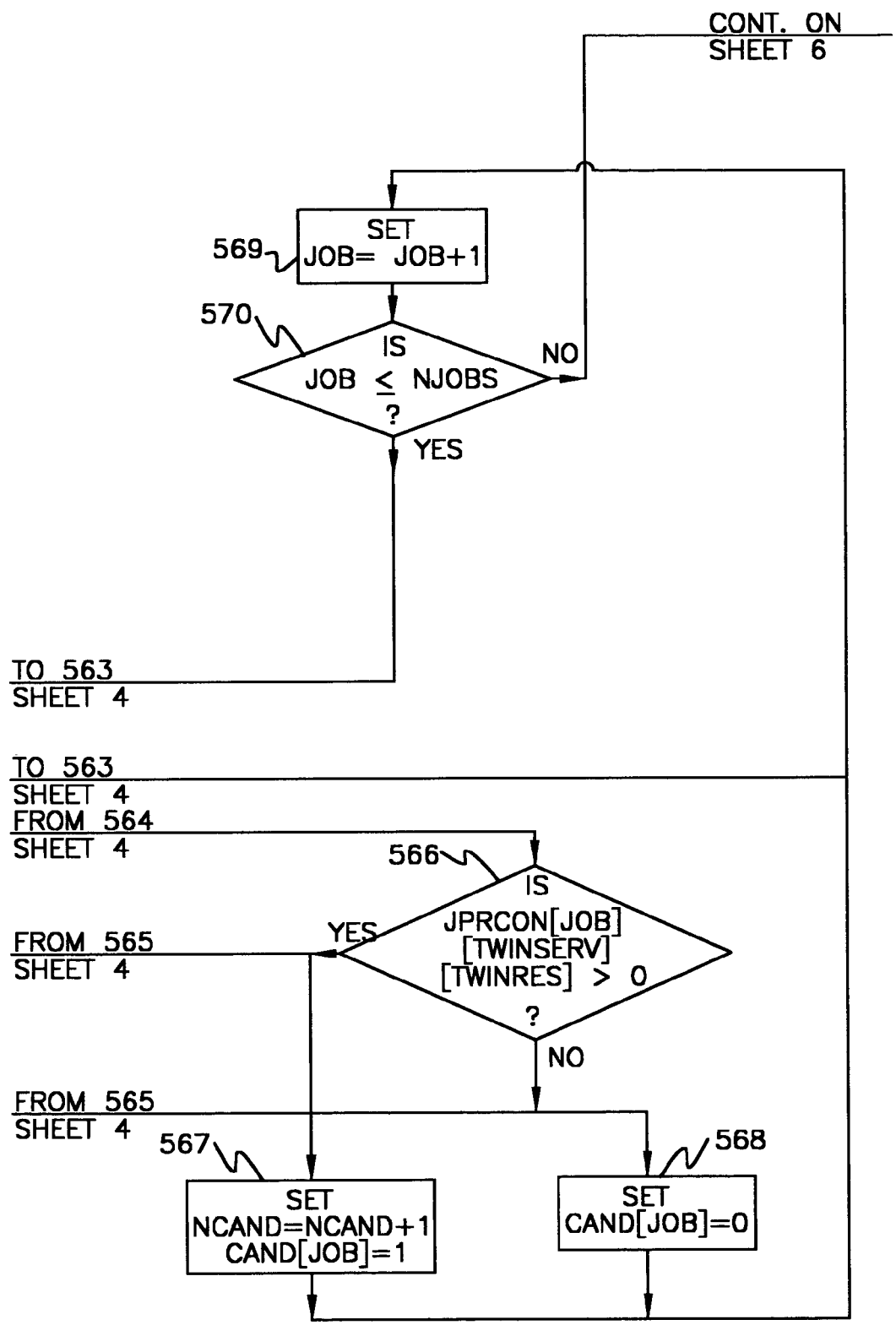
FIG. 5 (SHEET 5)

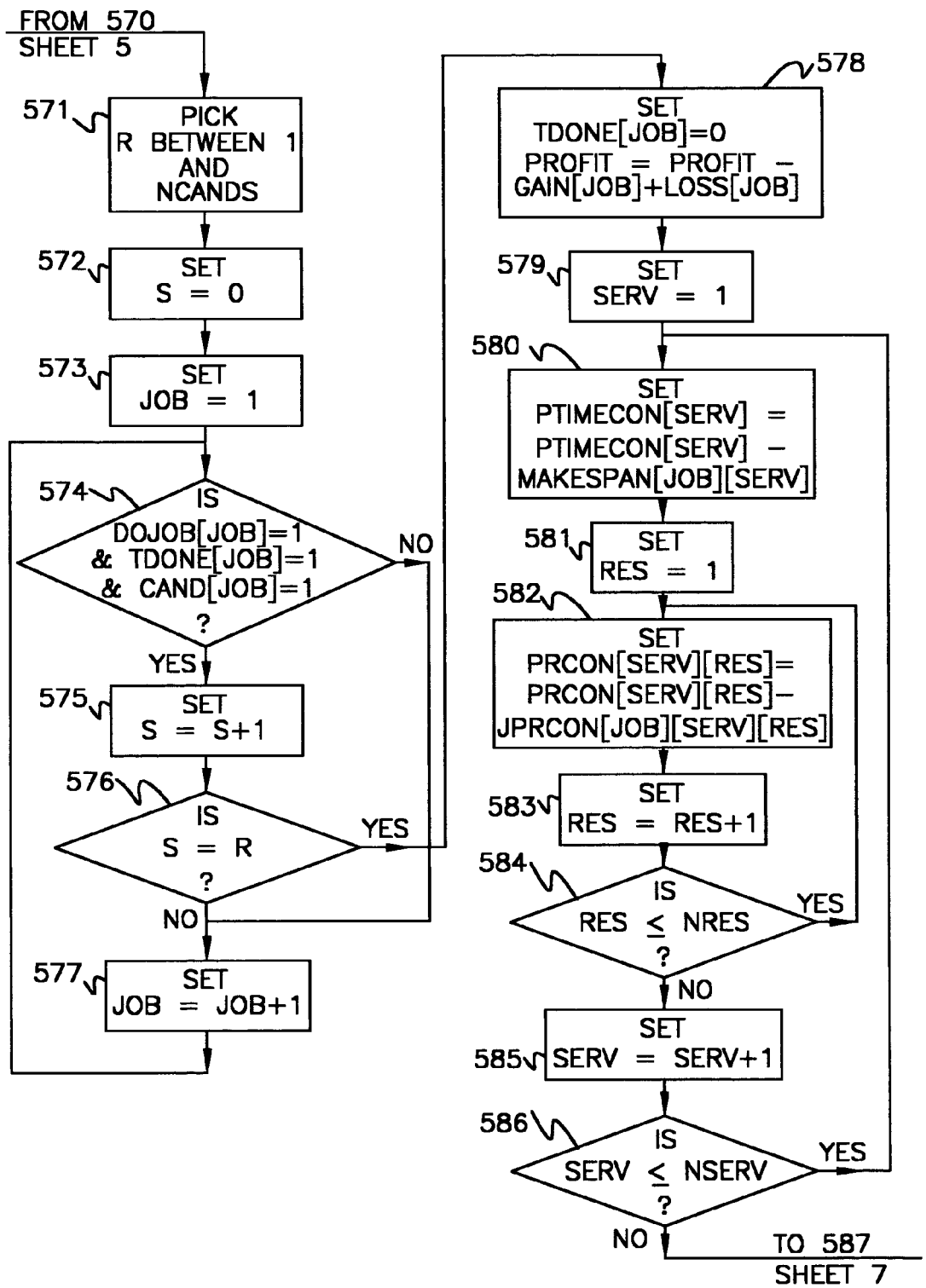
FIG. 5 (SHEET 6)

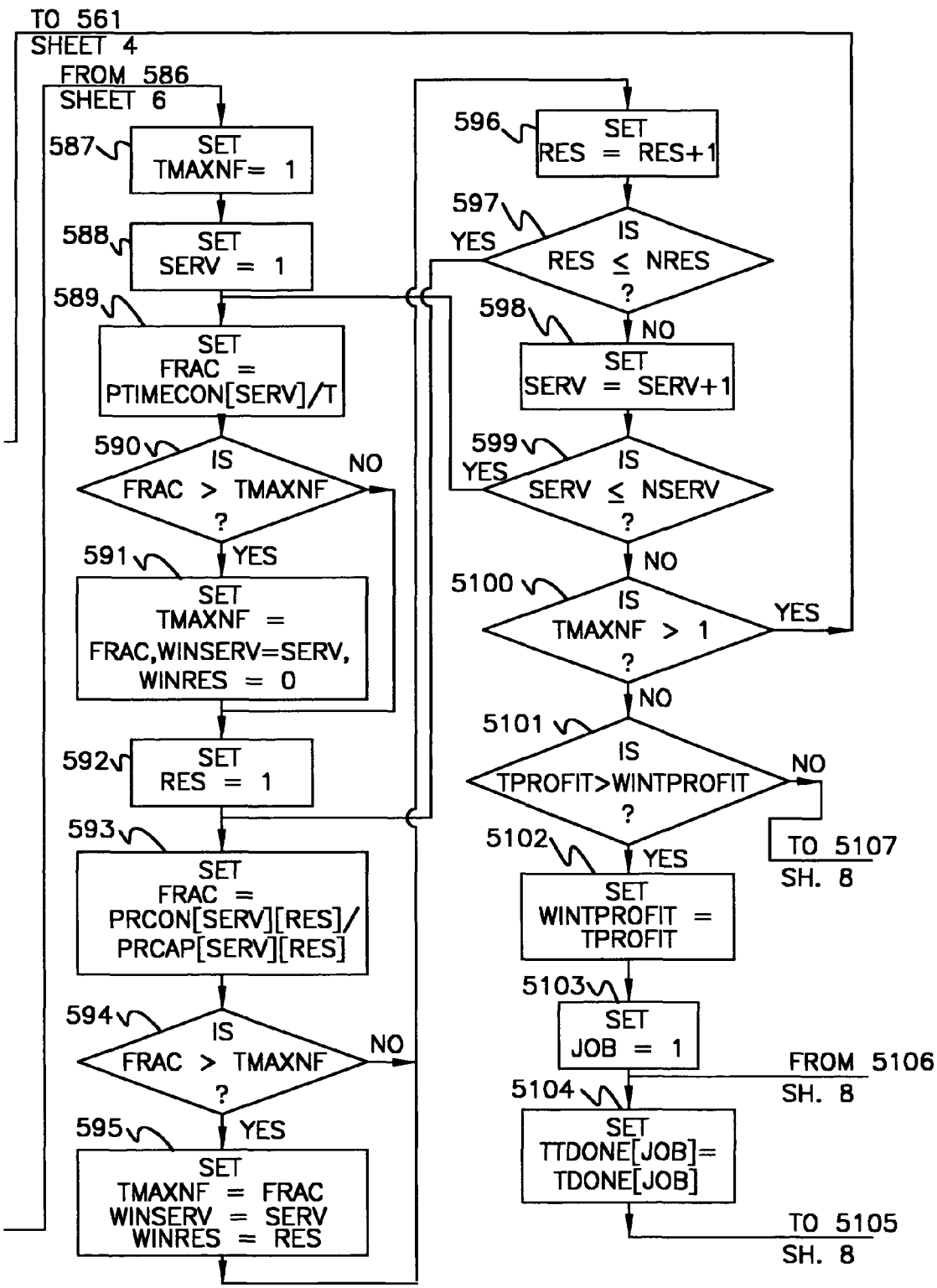
FIG. 5 (SHEET 7)

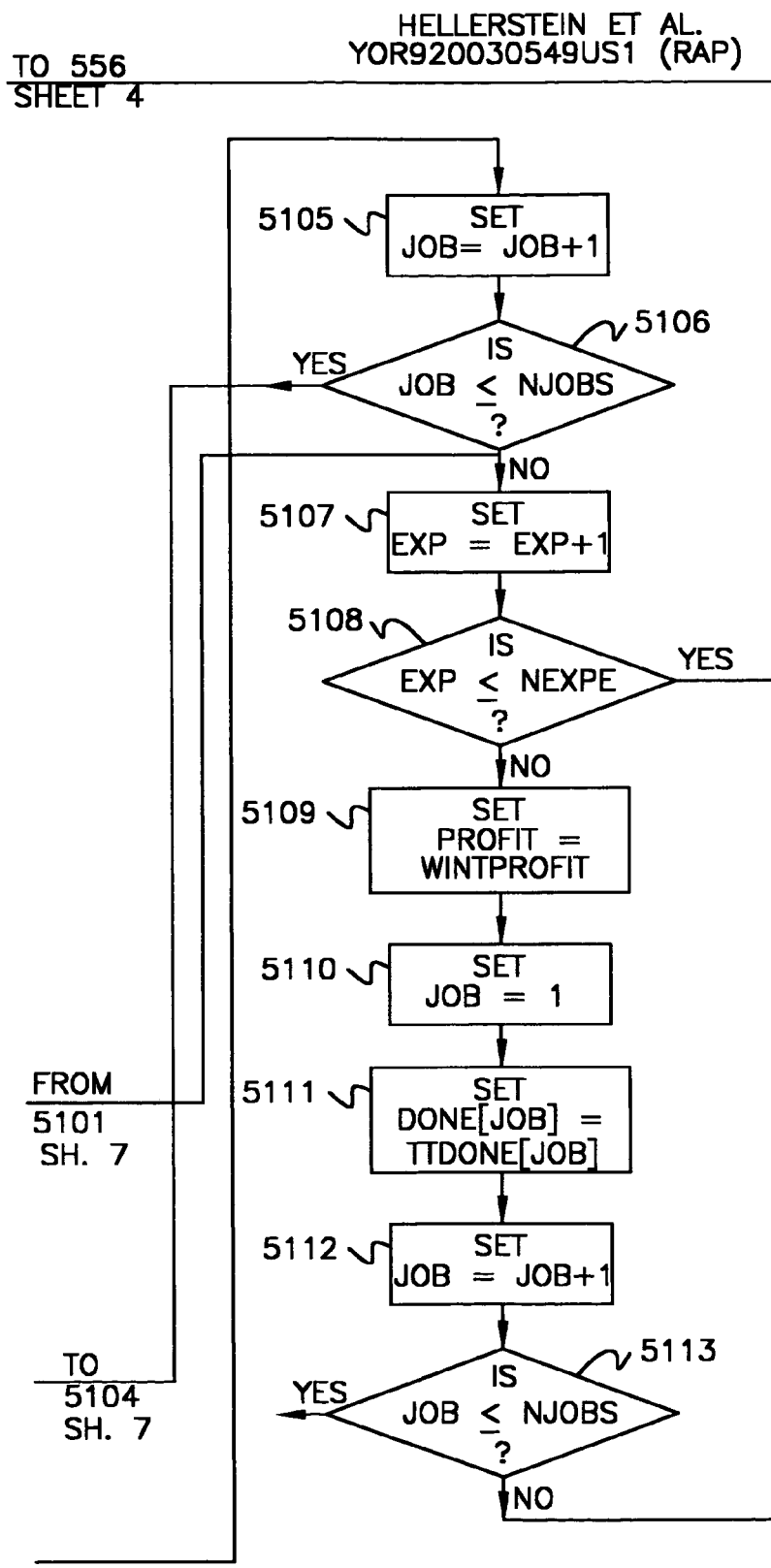
FIG. 5 (SHEET 8)

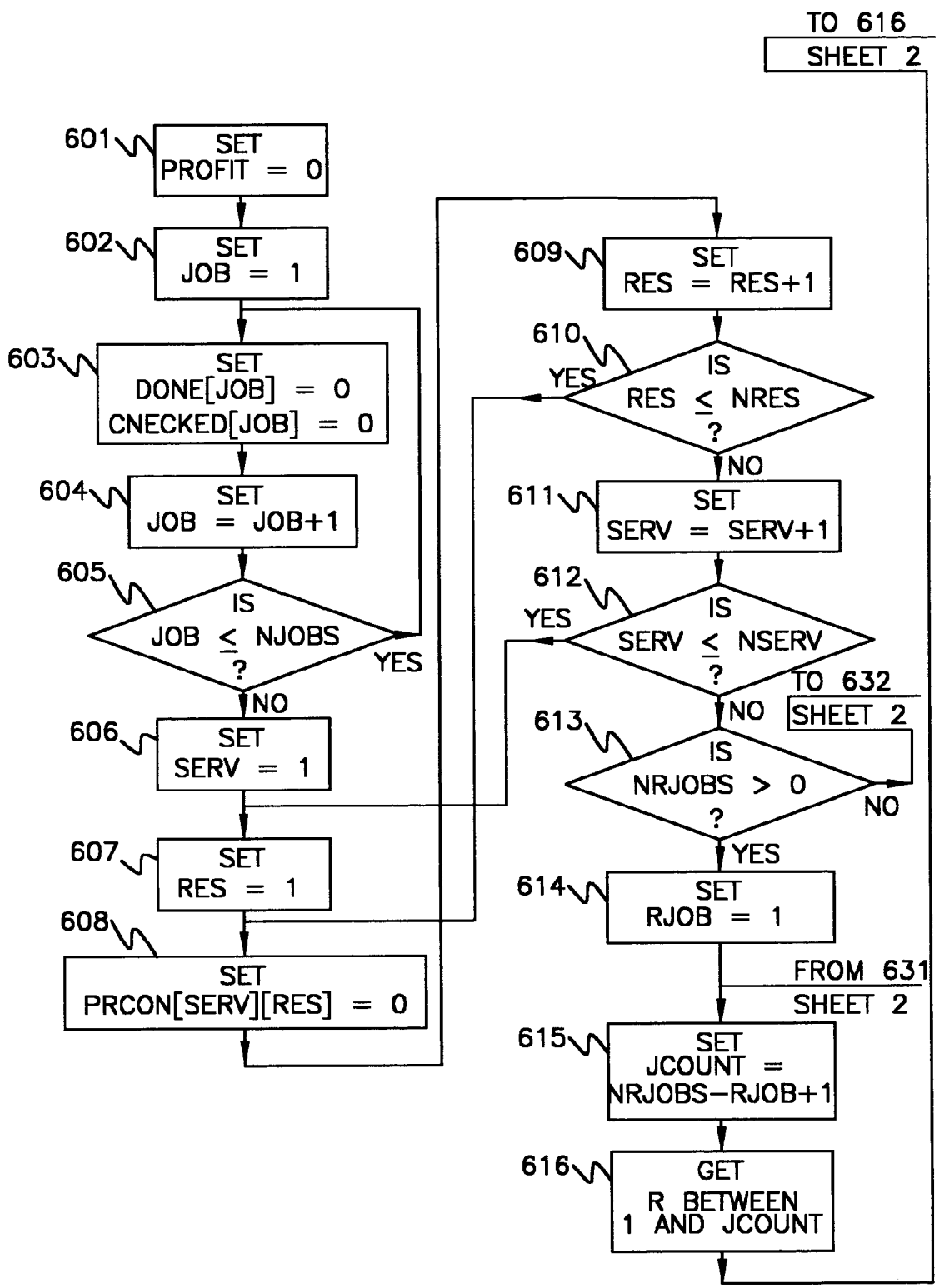
FIG. 6 (SHEET 1)

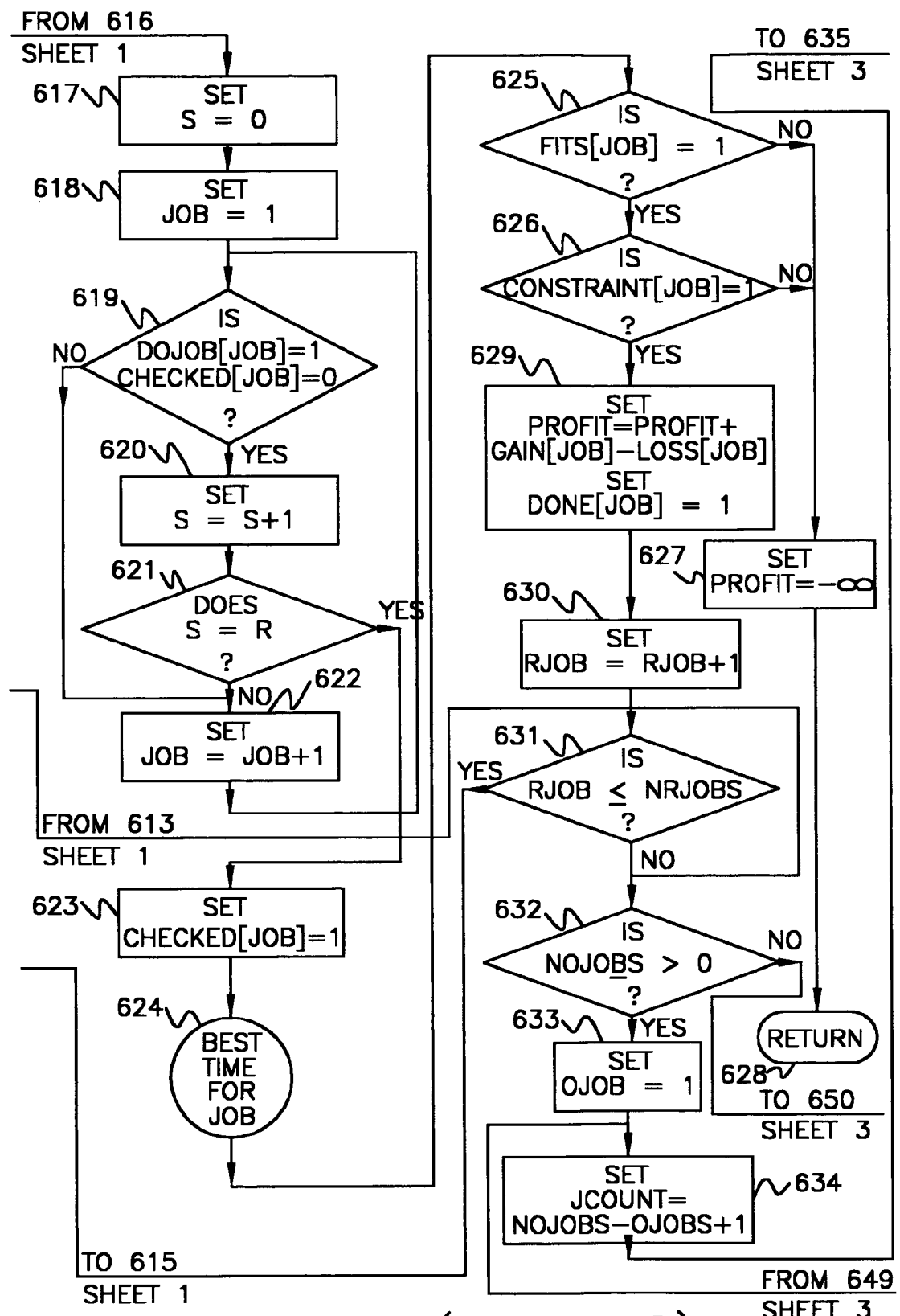
FIG. 6 (SHEET 2)

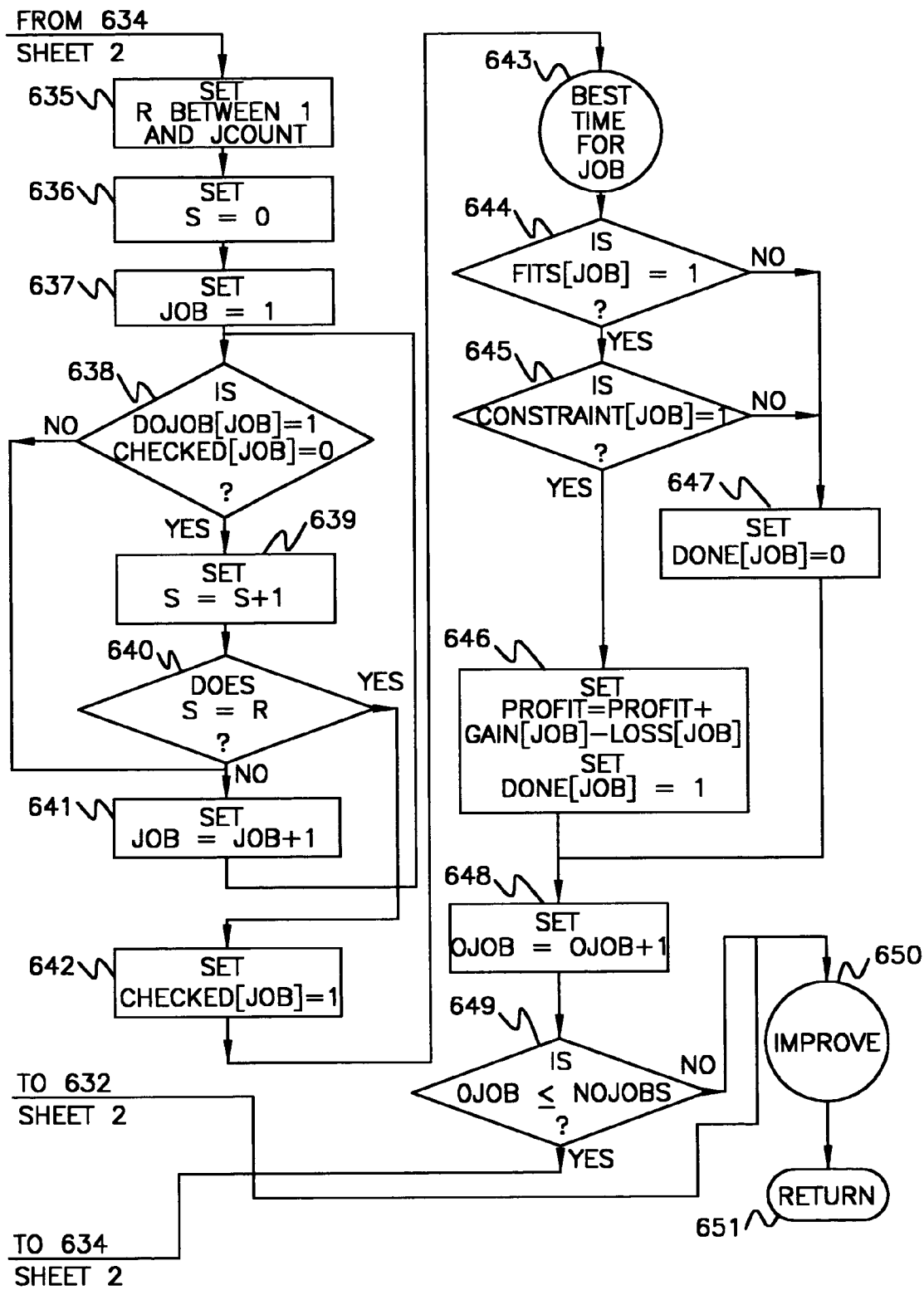
FIG. 6 (SHEET 3)

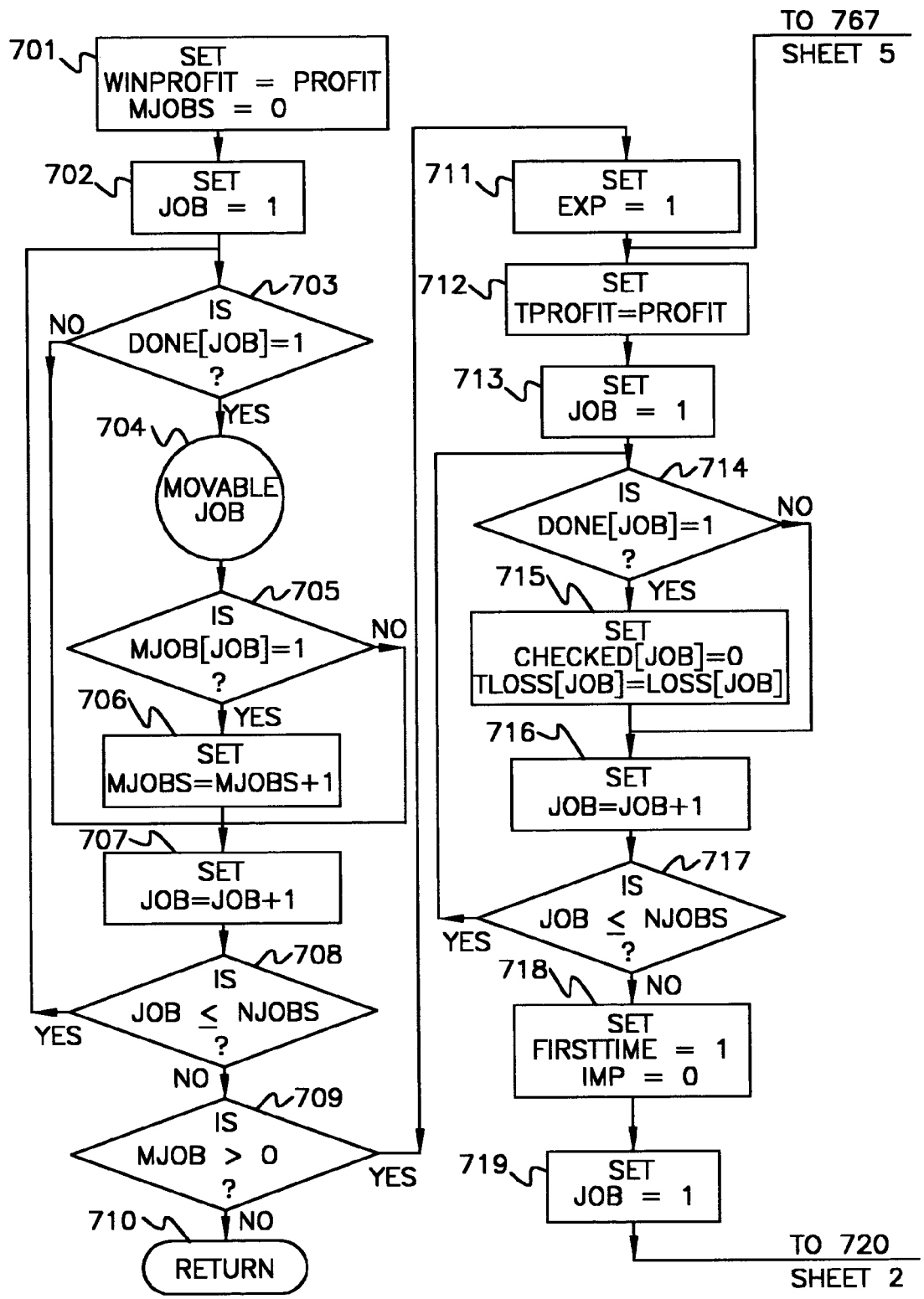
FIG. 7 (SHEET 1)

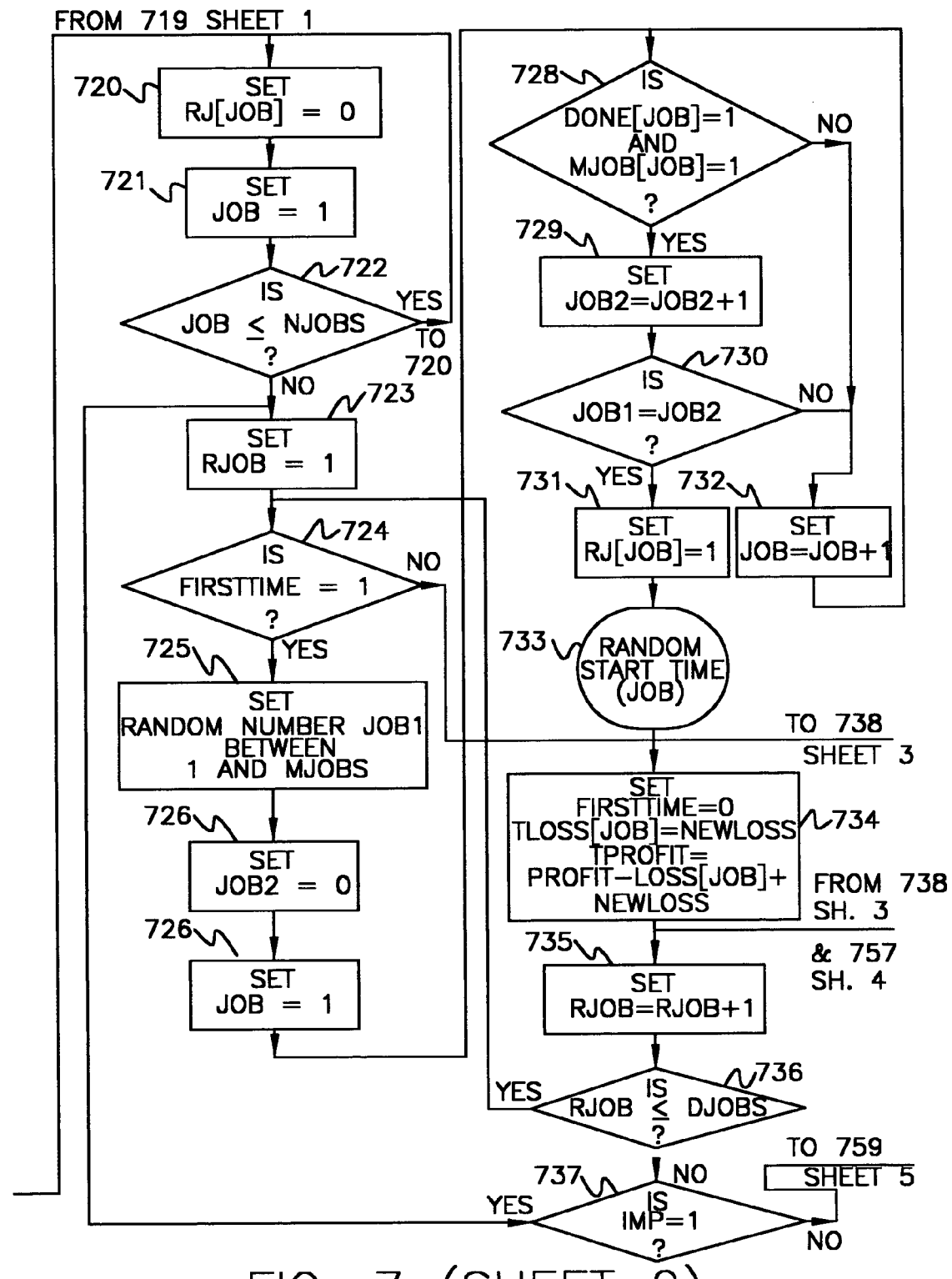
FIG. 7 (SHEET 2)

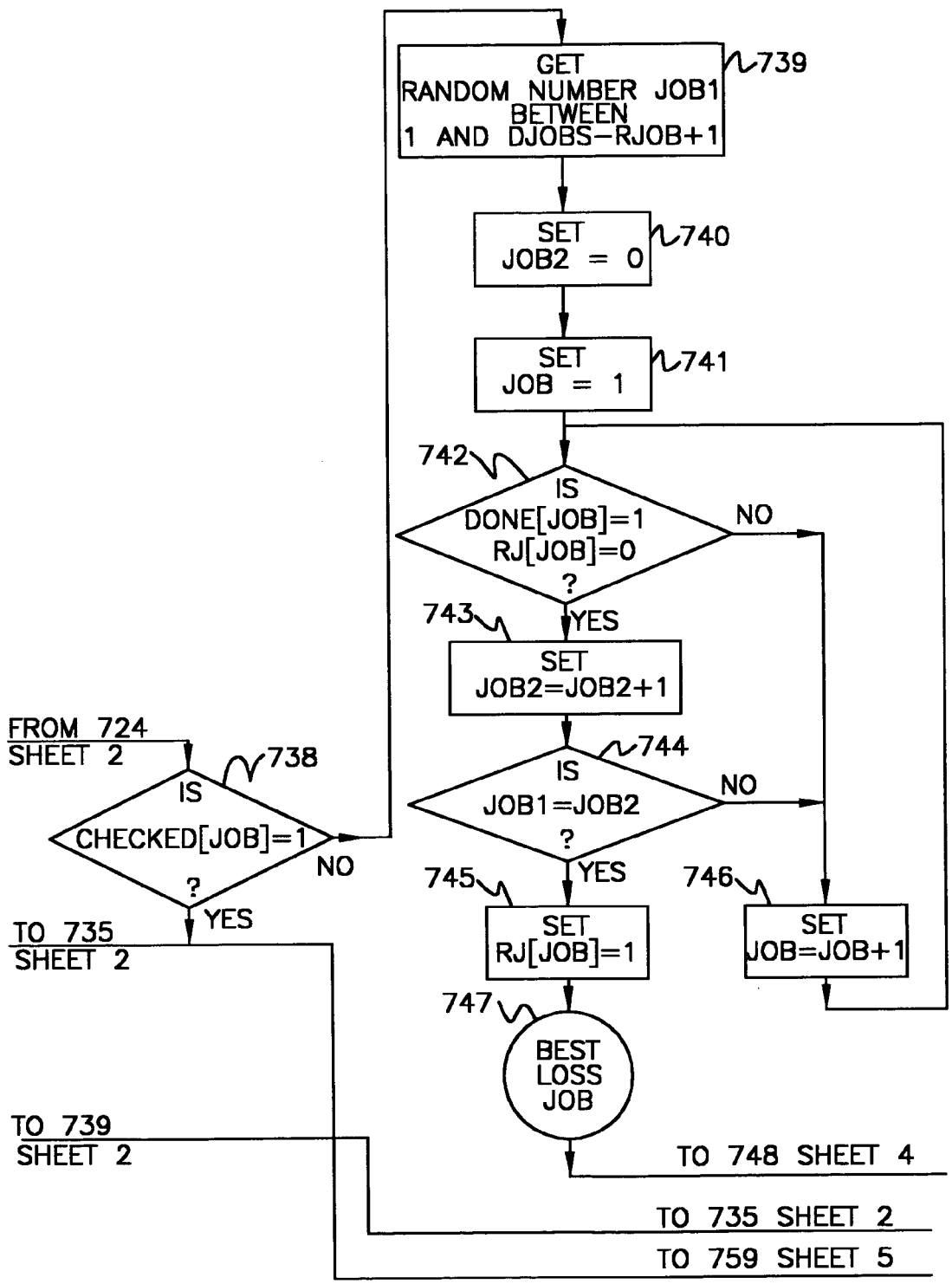
FIG. 7 (SHEET 3)

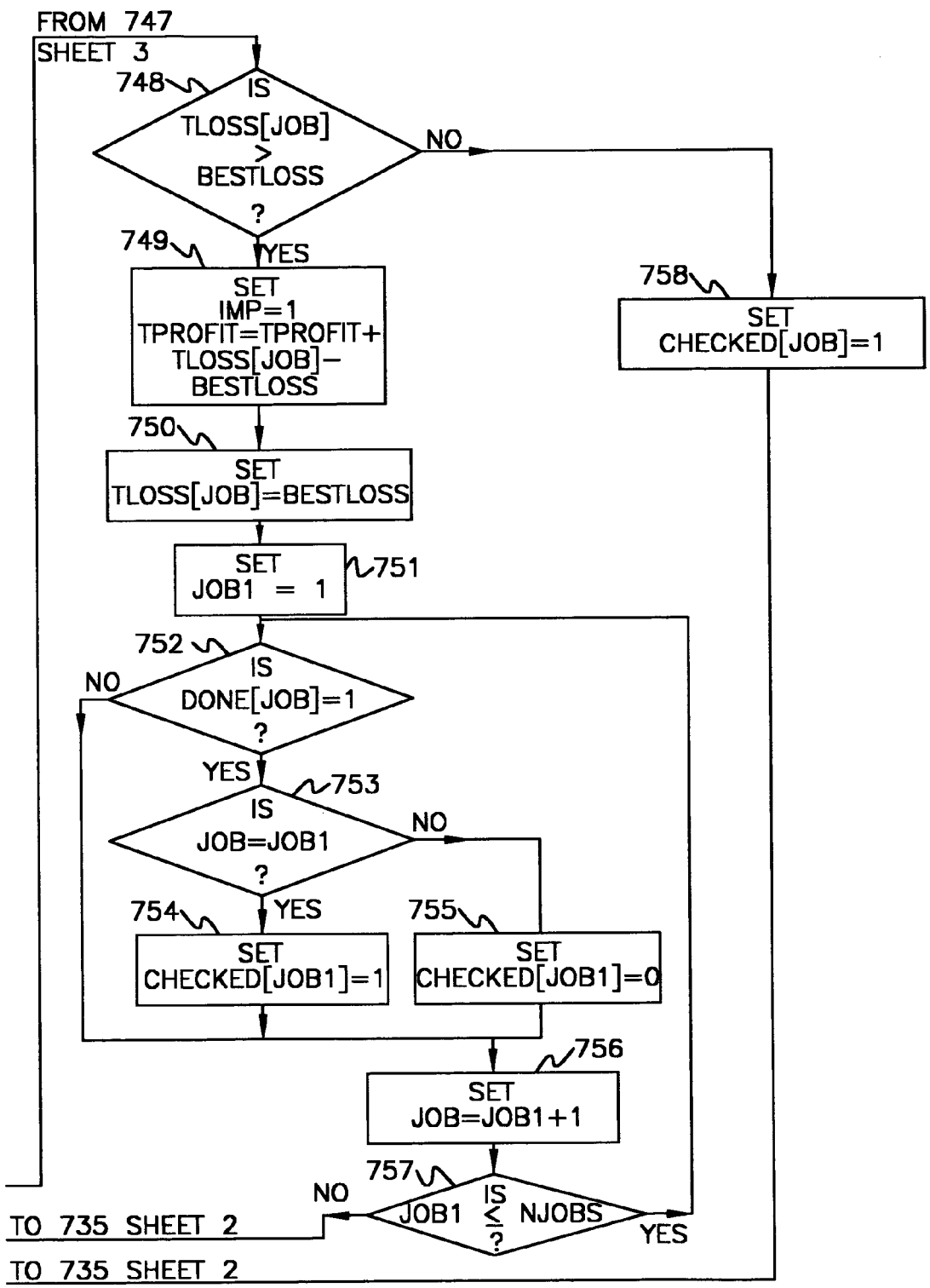
FIG. 7 (SHEET 4)

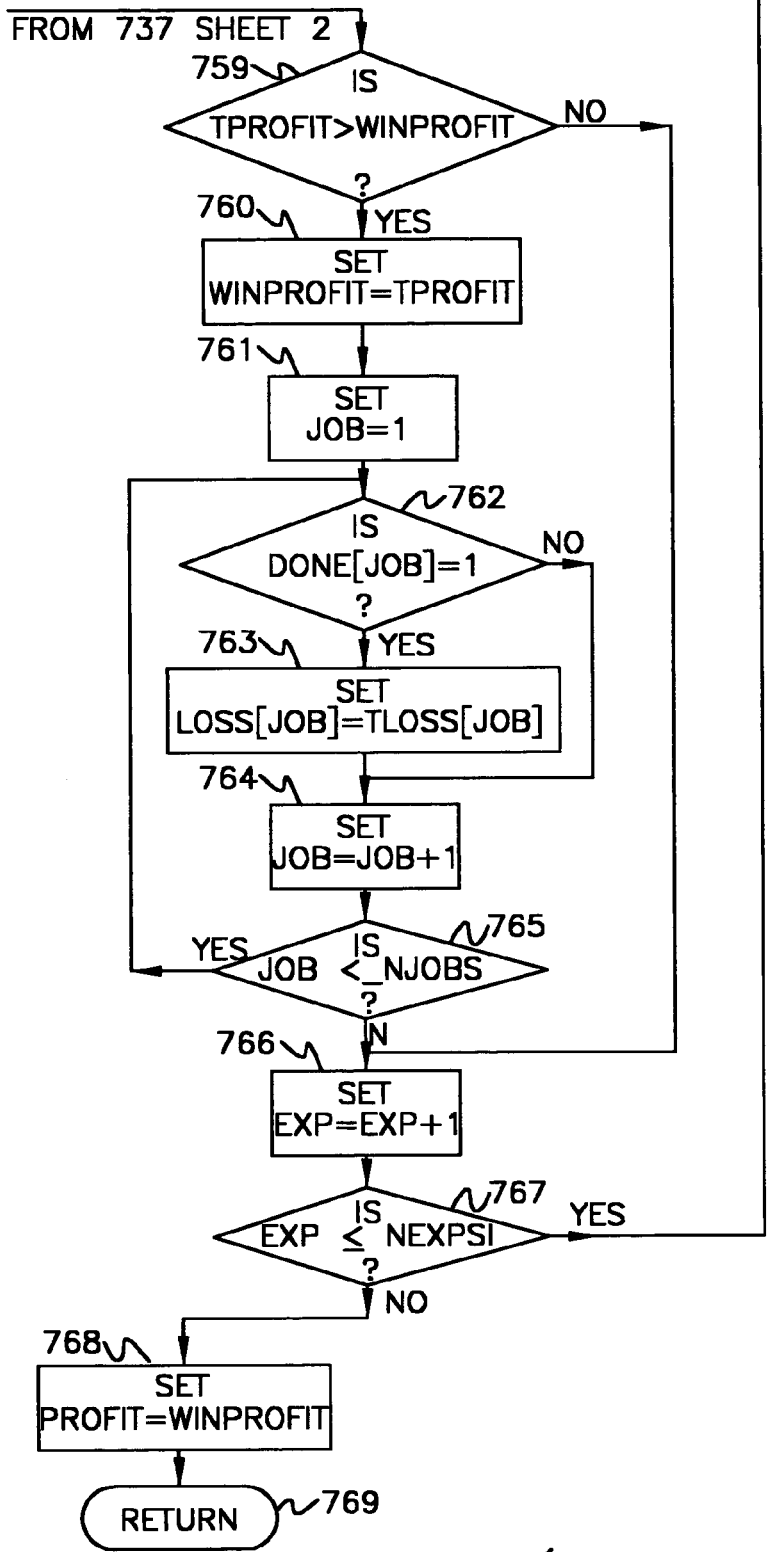
FIG. 7 (SHEET 5)

METHODS AND ARRANGEMENTS FOR PLANNING AND SCHEDULING CHANGE MANAGEMENT REQUESTS IN COMPUTING SYSTEMS

FIELD OF THE INVENTION

The present invention relates generally to planning and scheduling, and more particularly, to techniques for providing plans and schedules which maximize profits when accommodating change management requests in a computing system.

BACKGROUND OF THE INVENTION

Change Management is central to ensuring the availability, reliability, and quality of information technology (IT) services. Change Management signifies the process by which IT systems are modified to accommodate considerations such as software fixes, hardware upgrades and performance enhancements. The change management process typically starts with the submission of a Request For Change (RFC), which can be viewed as a job in scheduling terms. Many RFCs may be considered for execution concurrently. Some or all of these RFCs may be chosen to be done during a period of time known as a change window. The RFC describes what is to be done, usually in terms of hardware/software artifacts to change (deploy, install, configure, uninstall). It might also indicate the deadline by which the change needs to be completed. Examples include changing the schema of a database table in a running application and installing a new release of a web application server in a multi-tiered eCommerce system. An important observation is that many changes are not explicitly included in the RFC. Rather, they are merely implied. For example, applications must be recompiled if they use a database table whose schema is to change. Implicit changes are a result of various kinds of relationships, such as service dependencies and resource sharing. There is a well-established methodology for change management. Some key steps in this methodology are:

1. Assess the impact of changes in terms of the resources and services affected;
2. Create a Change Plan that dictates how the change should be implemented;
3. Verify the Change Plan (for example, through review by a change management team in discussions with affected departments);
4. Test the Change Plan by doing "dry runs", especially for very disruptive and/or high risk changes;
5. Ultimately implement the change by executing the plan.

A Change Plan typically consists of a set of tasks needed to complete the RFC, such as "bring down application server 1" and "copy x.ini to server 2". The plan itself specifies the partial order of tasks. Note that items (2)-(5) relate to creating, evaluating, and implementing the Change Plan.

In the current state of the art Change Plans are created manually, not automatically. But this manual creation process is time consuming, difficult and error prone. For a large computing system it may be almost impossible. A need therefore exists for automating change management.

SUMMARY OF THE INVENTION

In accordance with at least one presently preferred embodiment of the present invention, there is broadly contemplated a system and method for providing plans and schedules which maximize profits when accommodating change management requests in a computing system.

In summary, one aspect of the invention provides a method for planning and scheduling tasks within at least one request for change (RFC) within a change window in a computing system, comprising the steps of deciding whether or not an RFC should be done; for each RFC to be done, assigning individual tasks within each RFC to acceptable servers; and for each RFC to be done, assigning the start times to said individual tasks.

Another aspect of the present invention provides a system for planning and scheduling tasks within at least one request for change (RFC) within a change window in a computing system, comprising an arrangement for deciding whether or not an RFC should be done; an arrangement for assigning individual tasks to acceptable servers for each RFC to be done; and an arrangement for assigning the start times to said individual tasks for each RFC to be done.

An additional aspect of the present invention provides a program storage device readable by machine, tangibly embodying a program of instructions executable by the machine to perform a method for planning and scheduling tasks within at least one request for change (RFC) within a change window in a computing system, said method comprising the steps of: deciding whether or not an RFC should be done; for each RFC to be done, assigning individual tasks within each RFC to acceptable servers; for each RFC to be done, assigning the start times to said individual tasks.

For a better understanding of the present invention, together with other and further features and advantages thereof, reference is made to the following description, taken in conjunction with the accompanying drawings, and the scope of the invention will be pointed out in the appended claims.

BRIEF DESCRIPTION OF THE DRAWINGS

FIG. 2 is a flowchart illustrating the operation of the main scheme of the planner and scheduler (P&S).

FIG. 3 is a flowchart illustrating the operation of the phase 1 scheme.

FIG. 4 is a flowchart illustrating the operation of the task assignment scheme.

FIG. 5 is a flowchart illustrating the operation of the objective function estimation scheme.

FIG. 6 is a flowchart illustrating the operation of the phase 2 scheme.

FIG. 7 is a flowchart illustrating the operation of the objective function improvement scheme.

DESCRIPTION OF THE PREFERRED EMBODIMENTS

Several other copending and commonly owned U.S. patent applications, filed concurrently herewith, disclose various processes and arrangements whose details may, in the role of background information, help provide a better understanding of one or more of the embodiments disclosed and contemplated herein. Accordingly, those applications are hereby fully incorporated by reference as if set forth in their entirety herein, and are as follows (including the title and attorney docket number for each one): "Methods And Arrangements for Ordering Changes in Computing Systems"; and "Methods and Arrangements for Automated Change Plan Construction and Impact Analysis".

Figure 1:
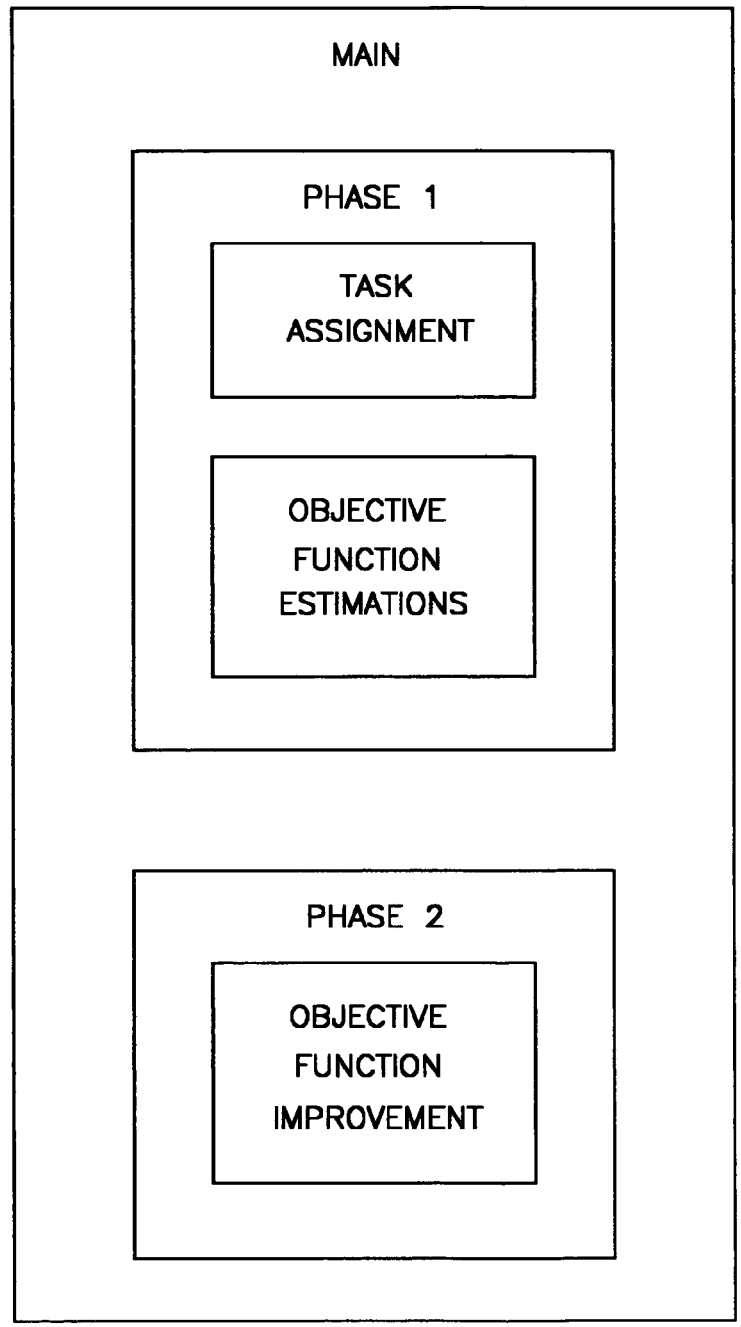
FIG. 1a is a schematic diagram of the overall system architecture in accordance with the present invention.
FIG. 1b is a block diagram illustrating various schemes in accordance with the present invention.
Figure 1A:
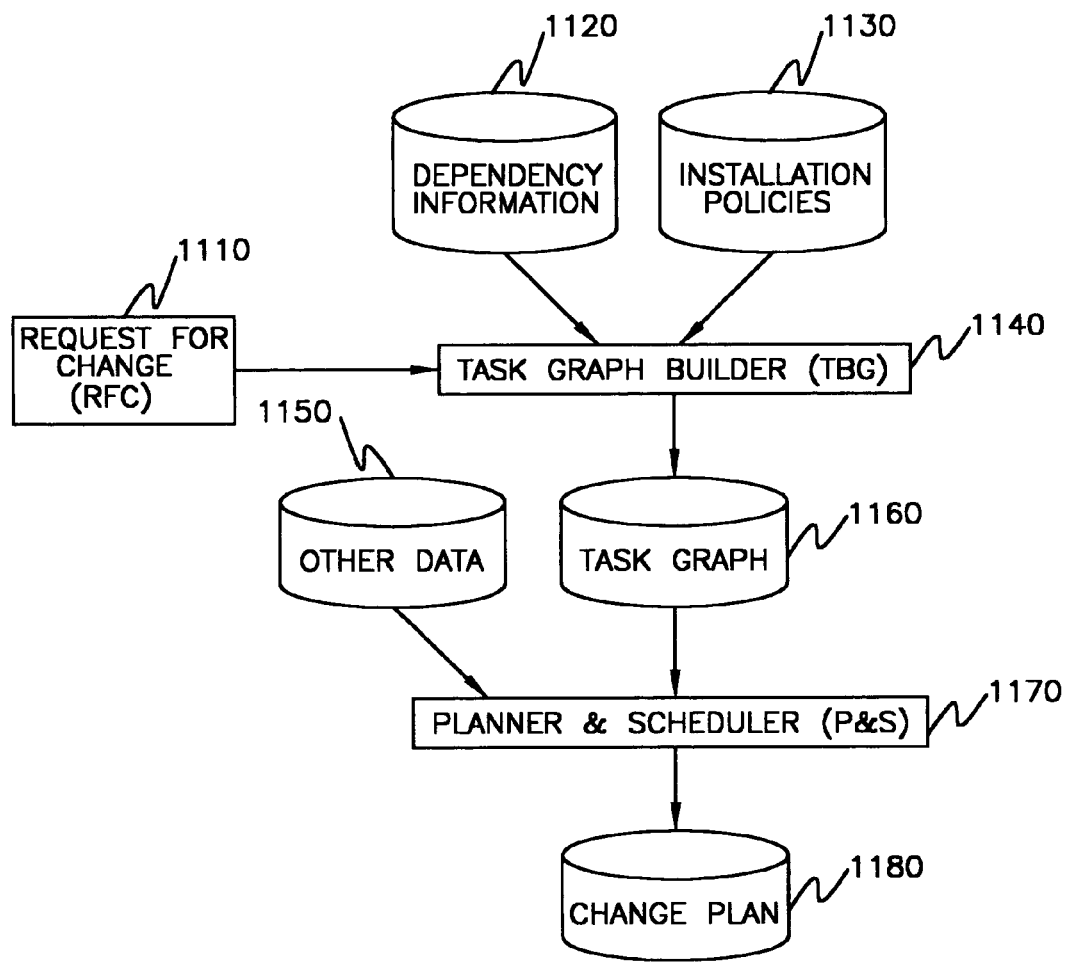

Referring now to FIG. 1a, in accordance with the present invention, the overall system architecture preferably consists of a Task Graph Builder (TGB) 1140 and a Planner and Scheduler (P&S) 1170. The Task Graph Builder 1140 determines the temporal and location constraints of tasks needed to complete the RFC 1110. Such a Task Graph is preferably constructed based on dependency information 1120 and installation policies 1130 (for example, time-of-day considerations for making changes). The P&S 1170 uses the Task Graph 1160 and other data 1150 to construct the Change Plan 1180. Examples of other data include cost-related information. Planning specifies the partial order of tasks and binds logical to physical resources (for example, selecting which of several available machines should become the application server). Scheduling determines the times at which actions take place.

In accordance with the present invention, P&S is viewed as an optimization problem wherein the goal is to maximize the profits derived from performing the jobs associated with a selected subset of the RFCs. The profit for each RFC is expressed as the value of performing the job minus the associated costs. The generic nature of the objective function incorporates a large number of practical variants as special cases. In addition, the resulting P&S obeys a variety of realistic temporal, location-specific and other types of constraints. This very general formulation differs from the state of the art of scheduling theory as defined by J. Blazewicz, K. Ecker, G. Schmidt and J. Weglarz, Scheduling in Computer and Manufacturing Systems, Springer-Verlag, 1993; E. Coffman, editor, Computer and Job-Shop Scheduling Theory, John Wiley and Sons, 1976; and M. Pinedo, Scheduling: Theory, Algorithms and Systems, Prentice Hall, 1995.

However, the formulation described in this invention is mathematically intractable in the sense that it is effectively impossible for the scheme described in a preferred embodiment (or that of any other scheme) to find an exact optimal solution in a reasonable amount of time. For information on difficult problems of this sort see M. Garey and D. Johnson, Computers and Intractability, W.H. Freeman and Company, 1979. The optimization techniques employed in the preferred embodiment of this invention determine a very high quality solution in a time which scales nicely with the problem size. They do so by decoupling the problem into two components, with the results of the first component fed into the second. The first component decides which RFCs to do during a change window, and for those that are done, plans and provides relativized schedules for the various tasks which comprise those RFCs. That is, the tasks are assigned to servers and are assigned times which are known offsets from the (as yet unknown) start time of the overall RFC itself. The second component solves the problem of scheduling the start times of the executed RFCs themselves. (Taken together, the start time of an individual task within the RFCs can be computed as the start time of the relevant RFC plus the task time offset.) Both of these problem components are solved by schemes which fall generally into the category of randomized algorithms. For information on such schemes see R. Motwani and P. Raghavan, Randomized Algorithms, Cambridge University Press, 1995.

In accordance with the present invention, the Planner and Scheduler (P&S) optimization problem formulation emphasizes the generic nature of the formulation, as it pertains to the objective function and the constraints. The formulation allows a large collection of interesting and useful variants to be solved as special cases. Naturally, this generic formulation causes the overall optimization problem solution to be that much harder. However most reasonable special cases are mathematically intractable in the same sense anyway. The P&S therefore employs heuristic solution techniques, achieving high quality but not typically strictly optimal solutions. The invention is hierarchical in nature. Each Request For Change (RFC) corresponds to a job which may or may not be done during the particular window of time, called the change window under consideration. Associated with each job are a set of tasks which are interrelated by temporal and location-specific dependencies arising from the TGB, and a variety of other constraints as well. The P&S solution respects this hierarchy, effectively decoupling the problems of planning and scheduling the various tasks which comprise each job from the problem of scheduling the jobs themselves. Let $\{1, \ldots, J\}$ be the set of jobs, indexed by j. Let $I_j = \{1, \ldots, I_j\}$ be the set of tasks in job j, indexed by i. In general terms, the present invention attempts to maximize the value associated with the jobs that will be done within a given change window minus the total costs of jobs that will be done (and thus optimizing the overall profits), while satisfying the following extensive set of constraints:

1. Precedence constraints among tasks within a job are respected. In other words, if task $i_1$ of job j is required to finish before task $i_2$ of job j starts, the scheduler will enforce this. (This could be called a finish-to-start (FS) constraint.)

2. Similarly, start-to-start (SS) constraints are respected for each job. Thus task $i_1$ of job j may required to start before task $i_2$ of job j starts.

3. Start-to-finish (SF) constraints are respected for each job. Thus task $i_1$ of job j may be required to start before task $i_2$ of job j finishes.

4. Finish-to-finish (FF) constraints are respected for each job. Thus task $i_1$ of job j may be required to finish before task $i_2$ of job j finishes.

5. Tasks only get assigned to acceptable servers. The list of acceptable servers may be as big or as small as desired. In particular, the list may consist of all the servers or just one. It might also consist of a specific class of servers.

6. Colocation (CL) task/server assignment constraints are met for all jobs. Thus, tasks $i_1$ and $i_2$ of job j may be required to be performed on the same server.

7. Exlocation (EL) task/server assignment constraints are met for all jobs. Thus, tasks $i_1$ and $i_2$ of job j may be required to be performed on different servers.

8. Resource capacity constraints are met on each server. These constraints might be used to enforce CPU utilization, memory and disk capacity requirements, for example.

9. Jobs get done if they are required. For example, those jobs with a deadline that falls within the change window must be performed. Others might be postponed for the time being, and thus might be regarded as optional. (They might, for example, get done during a subsequent change window.)

10. Each task of a job that gets done is assigned to a single server.

11. No server can work on more than one task at any time.

12. All tasks on all jobs that get done must be performed during the change window.

In the above list, constraints (1)-(4) are temporal, and arise from the TGB. Constraints (5)-(8) are location-specific, and may arise from the RFCs themselves, by virtue of policy, or from the system state. Constraint (9) ensures that required jobs get scheduled. Constraints (10)-(12) are technical but standard scheduling requirements.

In order to formalize these concepts the following additional notation is required. Let $\prec_j$ denote the precedence relation for job j derived from the TGB. (Without loss of generality assume tasks are in topological order.) Let $\{1, \ldots, P\}$ be the set of servers, indexed by p, and $\{1, \ldots, R\}$ be the set of resource types, indexed by r. Let T denote the length of the change window.

There will be a set $\kappa_j = \{1, \ldots, K_j\}$ of cost summands for job j, indexed by k. Each summand k will last from the start of task $\alpha_{j,k} \in I_j$ to the end of task $\beta_{j,k} \in I_j$. The objective function will integrate these cost summands for this duration of time, and then add these integrals together to obtain the cost component of the objective function. Special cases include costs which run through the duration of the entire job ($\kappa_j = 1, \alpha_{j,1} = 1, \beta_{j,1} = I_j$) and costs which are task-specific ($\kappa_j = I_j, \alpha_{j,k} = \beta_{j,k} = k$), define $X_j$ to be 1 if job j must be done, and 0 otherwise. The precedence relation $\prec_j$ for job j yields a finish/start set $FS_j \subset I_j \times I_j$: $(i_1, i_2) \in FS_j \Leftrightarrow i_1 \prec_j i_2$. Similarly there is a start/start set $SS_j \subset I_j \times I_j$, a start/finish set $SF_j \subset I_j \times I_j$ and a finish/finish set $FF_j \subset I_j \times I_j$. (Of these four types of temporal constraints, the precedence, or finish-to-start, constraints are the most common.) Let $A_{i,j}$ denote the acceptable server set for task (i, j). Let $CL_j \subset I_j \times I_j$ be the colocation set for job j, and $EL_j \subset I_j \times I_j$ be the exlocation set. Let $t_{i,j,p}$ denote the execution time of task (i, j) if assigned to server p. (That is, the invention allows for heterogeneous servers. It also allows for servers which cannot handle certain tasks. Specifically, the execution time of such a task and server can be set to infinity.) Let $W_{p,r}$ denote the available (spare) capacity on server p of resource r. Assume that the net effect on resource r utilization of doing task (i, j) on server p is $W_{i,j,r}$. Let the value of doing job j be $V_j$. On the other hand suppose that the k th cost summand for doing job j at time t is given by $C_{j,k}(t)$. (The invention will typically be employed in scenarios where this function is constant within given intervals, for example, half hour periods, though this assumption is not strictly necessary.)

The P&S employs three types of decision variables: The first two are binary, namely:

$$x_j = \begin{cases} 1 & \text{if job } j \text{ is done} \\ 0 & \text{otherwise} \end{cases}$$

and $$a_{i,j,p} = \begin{cases} 1 & \text{if task } (i,j) \text{ is done on server } p \\ 0 & \text{otherwise} \end{cases}$$

The last is a real variable: $s_{i,j}$ is the start time of task (i, j). Together these describe whether or not the job will be done, and, if done, where and when its various tasks will be performed.

The following dependent variables can be derived easily from these, and make the overall optimization problem easier to formulate: The finish time of task (i, j) if done on server p is given by $f_{i,j,p} = s_{i,j} + t_{i,j,p}$. And there is an execution indicator function for task (i, j) given by $$Z_{i,j,p}(t) = \begin{cases} 1 & \text{if } a_{i,j,p} = 1, s_{i,j} \le t \le f_{i,j,p} \\ 0 & \text{otherwise} \end{cases}$$

Now the optimization problem at the heart of the P&S can be defined as follows:

Maximize $$\sum_j V_j x_j - \sum_j \sum_k \sum_i \sum_p a_{\beta_{j,k},j,p} \int_{s_{\alpha_{j,k},j}}^{f_{\beta_{j,k},j,p}} C_{j,k}(t) dt$$

such that $$f_{i_1,j,p} \le s_{i_2,j} \text{ if}(i_1, i_2) \in FS_j, x_j = 1, a_{i_1,j,p} = 1 \forall j \quad (1)$$

$$s_{i_1,j} \le s_{i_2,j} \text{ if}(i_1, i_2) \in SS_j, x_j = 1 \forall j \quad (2)$$

$$s_{i_1,j} \le f_{i_2,j,p} \text{ if}(i_1, i_2) \in SF_j, x_j = 1, a_{i_2,j,p} = 1 \forall j \quad (3)$$

$$f_{i_1,j,p_1} \le f_{i_2,j,p_2} \text{ if}(i_1, i_2) \in FS_j, x_j = 1, a_{i_1,j,p} = 1 \quad (4)$$

$$a_{i,j,p} = 0 \text{ if } p \notin A_{i,j} \forall (i, j) \quad (5)$$

$$a_{i_2,j,p} = 1 \text{ if } a_{i_1,j,p} = 1, (i_1, i_2) \in CL_j \forall i, j \quad (6)$$

$$a_{i_2,j,p} = 0 \text{ if } a_{i_1,j,p} = 1, x_j = 1, (i_1, i_2) \in EL_j \forall j \quad (7)$$

$$\sum_i \sum_j a_{i,j,p} w_{i,j,r} \le W_{p,r} \forall p, r \quad (8)$$

$$x_j \ge X_j \forall j \quad (9)$$

$$\sum_p a_{i,j,p} = x_j \forall i \quad (10)$$

$$\sum_i \sum_j Z_{i,j,p}(t) \le 1 \forall p, t \quad (11)$$

$$0 \le s_{i,j} < f_{i,j,p} \le T \text{ if } a_{i,j,p} = 1 \forall i, j \quad (12)$$

The objective function and the various constraints mimic in formal terms the scheduler definition given above. In particular, the numbering of the constraints corresponds exactly. The extra generality in the definition of the objective function now realizes its intended payoff: By judicious choices of the parameters, the present invention can solve many different scheduling problems which might appear at first to be unrelated. For example, within the context of this formulation the value or the number of all jobs done could be maximized. Downtime or the costs associated with downtime could be minimized. (See D. Patterson, A Simple Way to Estimate the Cost of Downtime, LISA 2002, Philadelphia, Pa., for simple techniques to estimate the cost of downtime.) Similarly, the effects of reduced performance could be minimized. The total execution time could also be minimized. The number of jobs which meet their deadlines could also be maximized. By employing a few additional tricks, easily understood by those skilled in the art, such as the use of "dummy" tasks and such, one could minimize multiple deadline penalties associated with the jobs and/or tasks, for example those arising from customer service level agreements (SLAs). One could minimize the average response time or the weighted average response time of the various jobs. (These tricks, moreover, would all be performed under the covers in a preferred embodiment of the present invention. The user of the present invention need only choose from a set of menu alternatives to accomplish any of these optimization alternatives.)

Figure 1B:
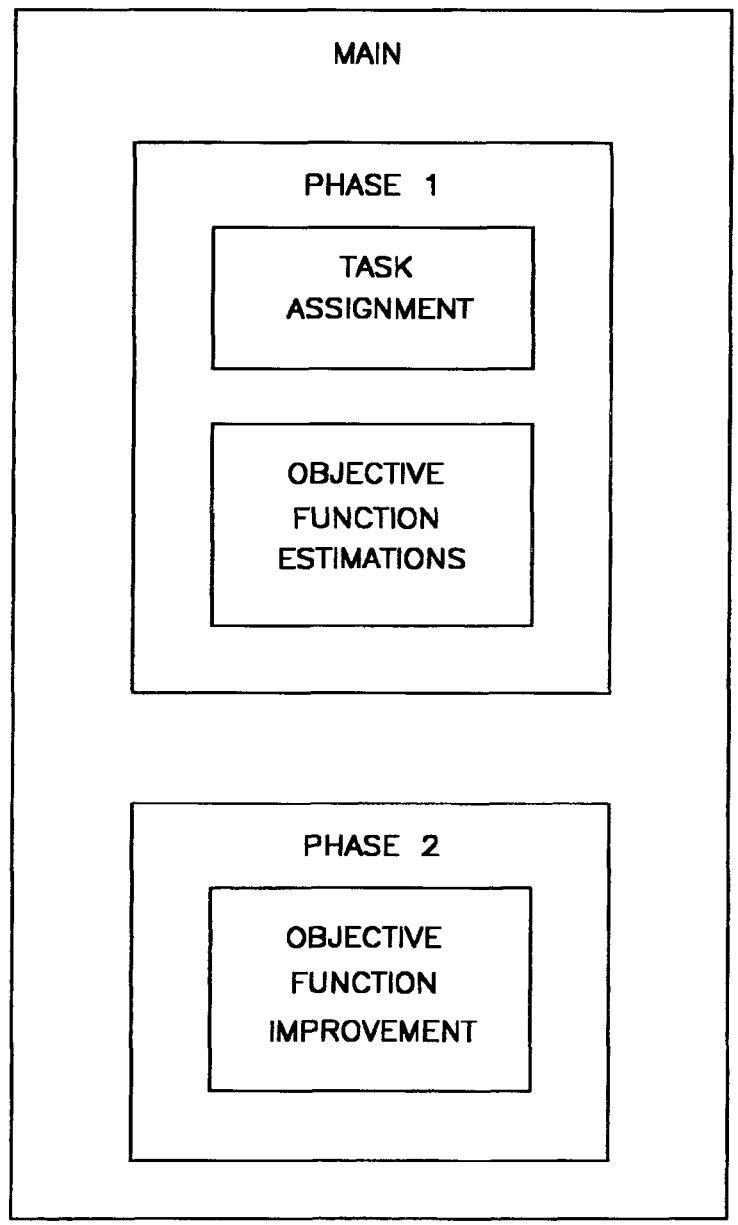

One preferred embodiment of the present P&S invention consists of a main scheme. This scheme falls in the category of so-called randomized algorithms, and employs both a phase 1 and a phase 2 scheme. The phase 1 scheme, in turn, employs a task assignment scheme and an objective function estimation scheme. The phase 2 scheme, on the other hand, employs an objective function improvement scheme. These schemes are each described below and are schematically illustrated in FIG. 1b. It should be noted that the invention differs slightly in terms of its notation from that of the mathematical description offered above. Specifically, the flowcharts use terminology more suitable for a coded embodiment.

Referring now to FIG. 2, the preferred main scheme of an embodiment of the invention will now be discussed. The main scheme starts by obtaining the input data in step 201. In step 202 the random seed X is initialized and Xseed is set equal to it. Random number schemes and their seeds are discussed in W. Press, S. Teukolsky and W. Vetterling, Numerical Recipes, Cambridge University Press, 1986. The value of the winning profit term winprofit is also initialized, to −∞, and the iteration number exp of the phase 1 randomized experiment is initialized to 1. Then the phase 1 scheme is invoked with seed X in step 203. It returns an estimated value profit, a bound on the actual profit, and simultaneously modifies the value of X. In step 204 the scheme determines if profit is greater than winprofit. If it is, step 205 sets winprofit to be profit, and sets the winning seed winX to be Xseed. Then the scheme proceeds to step 206. If profit is not greater than winprofit in step 204 the scheme proceeds directly to step 206. Step 206 increments the experiment iteration number exp by 1. In step 207 the scheme determines whether exp is less than or equal to the number of phase 1 randomized experiments nexp1. If it is the scheme returns to step 203. If not the scheme proceeds to step 208. Step 208 determines if winprofit is greater than −∞. If it is not, the scheme exits at step 209: No feasible solution can be found. If it is, the scheme proceeds to step 210, where X is set to winX. Then step 211 reinvokes the phase 1 randomized scheme with this seed, to recompute the best solution. (Those skilled in the art will recognize that the entire output of the best solution could be stored during the experiments themselves, rather than recomputing the best solution afterwards. The tradeoff is using extra memory versus using slightly more computation time. In a preferred embodiment the latter choice is made.) In step 212 the scheme sets Xseed to be X, initializes the value of winprofit to be −∞, and the iteration number exp of the phase 2 randomized experiment to 1. Then the phase 2 scheme is invoked with seed X in step 213. It returns an actual value profit and simultaneously modifies the value of X. In step 214 the scheme determines if profit is greater than winprofit. If it is, step 215 sets winprofit to be profit, and sets the winning seed winX to be Xseed. Then the scheme proceeds to step 216. If profit is less than or equal to winprofit in step 214 the scheme proceeds directly to step 216. Step 216 increments the experiment iteration number exp by 1. In step 217 the scheme determines whether exp is less than or equal to the number of phase 2 randomized experiments nexp2. If it is the scheme returns to step 213. If not the scheme proceeds to step 218. Step 218 sets X to winX. Then step 219 reinvokes the phase 2 randomized scheme with this seed, to recompute the best solution. In step 220 the resulting plan and schedule is output. Then the main scheme exits at step 221.

Referring now to FIG. 3, a preferred phase 1 scheme will now be discussed. The phase 1 scheme starts in step 301 by choosing a random number ranpick between 0 and 1. The generation of this random number will modify the value of X. This number will be used during the task assignment scheme. In step 302 the scheme sets the value profit to be 0. Then step 303 initializes the server serv to be 1. In step 304 the scheme initializes the value ptimecon[serv] to be 0. This array will track time consumption on the servers. Then step 305 initializes the resource res to be 1. In step 306 the value prcon[serv][res] to be 0. This array will track resource consumption on the servers. Then step 307 increments the value of res by 1. In step 308 the scheme checks to see if res is less than or equal to the number of resources nres. If it is the scheme returns to step 306. If it is not the scheme proceeds to step 309, where serv is incremented by 1.

Step 310 checks to see if serv is less than or equal to the number nserv of servers. If it is the scheme returns to 304. If it is not the scheme proceeds to step 311, where the value job is initialized to 1. In step 312 the scheme initializes checked [job] to be 0. This array will indicate whether or not a job has been evaluated thus far. In step 313 the scheme increments the value job by 1. Then step 314 checks to see if job is less than or equal to the number njobs of jobs. If it is the scheme returns to step 312. Otherwise the scheme proceeds to step 315, where it is checked if the number nrjobs of required jobs is positive. The case where there are no required jobs will be deferred for the moment. If there are required jobs step 316 initializes the value rjob to 1. Then step 317 sets jcount equal to nrjobs−rjob+1.

In step 318 a random integer r between 1 and jcount is chosen. The generation of this random number will modify the value of X. Then step 319 initializes the value s to be 0. In step 320 the scheme initializes job to be 1. Then step 321 checks to see if both dojob[job] is 1 and checked[job] is 0. The array dojob is input data. It keeps track of required and optional jobs as a 1 or 0, respectively. If the check in step 321 is positive, step 322 increments the value of s by 1. Then step 323 checks to see if s equals r. If it is not, or if the check in step 321 is negative, step 324 increments the value of job by 1. Then the scheme returns to step 321. If s equals r in step 323 the scheme proceeds to step 325, where checked[job] is set to 1. Then step 326 invokes the task assignment scheme for job. Among other things this scheme computes the value of feas. If feas is 1 it also assigns tasks and to servers, denoting utilized and non-utilized servers via an array userv[job] [serv], as 1 or 0, respectively. Additionally it computes the length makespan[job] from the beginning to the end of the job. A 1 indicates feasibility and a 0 indicates infeasibility. Step 327 checks the value of feas. If feas is 0 step 328 sets profit to be −∞. This is because no feasible solution has been discovered, even considering only the required jobs. Then step 329 returns to the main scheme, causing the experiment to fail. If feas is 1 in step 328 then the scheme proceeds to step 330, where serv is initialized to 1.

In step 331 the scheme checks if userv[job][serv] is 1. If it is, step 332 increments the value of ptimecon[serv] by the length makespan[job] of the job. Step 333 initializes the value of res to 1. Then step 334 increments the value of prcon[serv] [res] by the resource jprcon[job][serv][res] consumed. In step 335 the value of res is incremented by 1. Then step 336 checks to see if res is less than or equal to the number of resources nres. If it is the scheme returns to step 334. Otherwise step 337 increments the value of serv by 1. Step 337 can also be reached if the test in step 331 fails. Step 338 checks to see if serv is less than or equal to the number nserv of servers. If it is the scheme returns to step 331. Otherwise step 339 increments the value of rjob by 1. Then step 340 checks to see if rjob is less than or equal to the number nrjobs of required jobs. If it is the scheme returns to step 317. Otherwise the scheme proceeds to step 341, where it is checked if the number nojobs of optional jobs is positive. This step may also be reached from step 315, if there are no required jobs. The case where there are no optional jobs in step 341 will be deferred for the moment. If there are optional jobs step 342 initializes the value ojob to 1. Then step 343 sets jcount equal to nojobs−ojob+1.

In step 344 a random integer r between 1 and jcount is chosen. The generation of this random number will modify the value of X. Then step 345 initializes the value s to be 0. In step 346 the scheme initializes job to be 1. Then step 347 checks to see if both dojob[job] is 0 and checked[job] is 0. If the check in step 347 is positive, step 348 increments the value of s by 1. Then step 349 checks to see if s equals r. If it is not, or if the check in step 347 is negative, step 350 increments the value of job by 1. Then the scheme returns to step 347. If s equals r in step 349 the scheme proceeds to step 351, where checked[job] is set to 1. Then step 352 invokes the task assignment scheme for job.

Among other things this scheme computes the value of feas. If feas is 1 it also assigns tasks and to servers, denoting utilized and non-utilized servers via an array userv[job][serv], as 1 or 0, respectively. Additionally it computes the length makespan[job] from the beginning to the end of the job. Step 353 checks the value of feas. The case where feas is 0 is deferred for the moment. This optional job will not, however, be done in this experiment. If feas is 1 in step 353 then the scheme proceeds to step 354, where serv is initialized to 1. In step 355 the scheme checks if userv[job][serv] is 1. If it is, step 356 increments the value of ptimecon[serv] by the length makespan[job] of the job.

Step 357 initializes the value of res to 1. Then step 358 increments the value of prcon[serv][res] by the resource prcon[job][serv][res] consumed. In step 359 the value of res is incremented by 1. Then step 360 checks to see if res is less than or equal to the number of resources nres. If it is the scheme returns to step 358. Otherwise step 361 increments the value of serv by 1. Step 362 checks to see if serv is less than or equal to the number nserv of servers. If it is the scheme returns to step 355. Otherwise step 363 increments the value of ojob by 1. This step can also be reached if the test in step 353 fails. Then step 364 checks to see if ojob is less than or equal to the number nojobs of optional jobs. If it is the scheme returns to step 343. Otherwise the objective function estimation scheme is invoked. This scheme provides an estimate of the profit than can be achieved by an actual schedule employing the task assignments and relative schedules obtained in phase 1. Then in step 366 phase 1 returns to the main scheme.

The preferred task assignment scheme will now be described with reference to FIG. 4. This scheme starts in step 401 by initializing the value of task to 1. Step 402 initializes nok[task] to 0 and place[task] to be 0. Then step 403 initializes serv to be 1. In step 404 the scheme sets userv[job][serv] to be 0, aserv[job][task] to be 0, and watermark[serv] to be 0. Then step 405 sets tok[task][serv] equal to ok[job][task][serv]. Step 406 checks to see if tok[task][serv] equals 1. If it is, step 407 sets nok[task] equal to 1 and step 408 increments serv by 1. Step 408 can also be reached if tok[task][serv] equals 0 in step 406. In step 409 the scheme checks to see if serv is less than or equal to the number nserv of servers. If it is the scheme returns to step 404. Otherwise the scheme proceeds to step 410, where task is incremented by 1. Then step 411 checks to see if task is less than or equal to the number ntasks[job] of tasks for job. If it is the scheme returns to step 402. Otherwise it proceeds to step 412, which initializes nplaced to 0, ctime to 0 and makespan[job] to 0.

Step 413 initializes serv to be 1 and step 414 initializes res to be 1. In step 415 the scheme sets jprcon[job][serv][res] to be 0. Step 416 increments res by 1. Step 417 checks to see if res is less than or equal to the number nres of resources. If it is, the scheme returns to step 415. Otherwise the scheme proceeds to step 418, which increments serv by 1. Then step 419 tests to see if serv is less than or equal to the number nserv of servers. If it is, the scheme returns to step 414. Otherwise it invokes the ready list scheme for job and ctime in step 420. Those skilled in the art will understand that ready lists are part of many scheduling schemes. See, for example, E. Coffman, editor, Computer and Job-Shop Scheduling Theory, John Wiley and Sons, 1976. For a task to be on the ready list at time ctime means in this case that all FS and all SS dependencies have been met. The number nready of ready tasks is returned. Then step 421 sets success to be 0, and step 422 tests to see if nready is greater than 0. If it is not the scheme invokes a next event scheme, which returns the next event time on the event list, updating ctime. Those skilled in the art will recognize that keeping track of the next event is part of the bookkeeping of a ready list scheme. Then the scheme returns to step 420. If nready is greater than 0 in step 422, step 424 invokes a weighted random number generator to obtain a random task task on the ready list. The weight for each task A is the following ratio: The numerator is the maximum over all tasks B for which A→B, based on the FS constraints, of the minimum time to complete all tasks from A to B. The denominator is the earliest deadline of task B minus the current time ctime. The earliest deadline is computed over the SF and FF constraints for all tasks satisfying B→C, backtracking via the minimum task time to complete all tasks beyond B to C. The maximum value of this denominator is taken to be T minus ctime, and the minimum value is taken to be 0. (All tasks which are at or beyond their deadline thus have infinite weight, meaning that the weighted random number will choose arbitrarily from one of these with probability 1.) The generalization of this random number will modify the value of X. The minimum time to complete all tasks from one task to another is based on an all nodes shortest path scheme where the path distances are the minimum task execution times amongst all currently acceptable servers. Those skilled in the art will recognize that shortest path schemes are widely used in a variety of schemes. For details see E. Lawler, Combinatorial Optimization, Holt, Rinehart and Winston, 1976.

Step 425 checks to see if aserv[job][task] is greater than 0. This can occur because of the acceptable server colocation and exlocation constraints, and can be explicit or implicitly derived based on previous task assignments. The case where aserv[job][task] is 0 is deferred for the moment. If it is the scheme proceeds to step 426, where winserv is set to aserv[job][task]. Then step 427 sets success to 1 and increments nplaced by 1. Step 428 sets placed[task] to be 1 and step 429 sets userv[job][winserv] to be 1. Then step 430 updates the value of makespan[job] and watermark[winserv]. Step 431 adds watermark[winserv] to the event list. In step 432 the value of serv is initialized to 1. Step 433 checks to see if userv[job][serv] is 1. If it is, step 434 checks to see if ptimecon[serv]+makespan[job] is greater than T. If it is, there is no feasible solution, and the scheme returns in step 435. If not, or if userv[job][serv] is 0 in step 433, step 436 initializes res to be 1.

In step 437 the scheme increments jprcon[job][winserv][res] by jtrcon[job][task][res]. Step 438 checks to see if jprcon[job][winserv][res]+prcon[winserv][res] is greater than prcap[winserv][res]. If so, step 439 checks to see if dojob[job] is 1. If this is true, the feasibility test has failed on a required job, and the scheme returns in step 440. Otherwise, or if the test in step 438 fails, step 441 increments the value of res by 1. Then step 442 checks to see if res is less than or equal to the number nres of resources. If it is the scheme returns to step 431. Otherwise it proceeds to step 443, which increments the value of serv by 1. Then step 444 checks to see if serv is less than or equal to the number nserv of servers. If it is, the scheme returns to step 433. Otherwise it proceeds to step 445, which checks to see if nplaced is less than or equal to the number ntasks[job] of tasks for job. If it is, the scheme returns to step 420. Otherwise the scheme proceeds to step 446, which initializes serv to be 1.

Step 447 sets makespan[job][serv] to be 0 and step 448 checks to see if userv[job][serv] equals 1. If it is, step 449 sets makespan[job][serv] equal to makespan[job]. Then step 450 increments serv by 1. Step 450 can also be reached from step 448 if userv[job][serv] equals 0. Step 451 checks to see if serv is less than or equal to the number nserv of servers. If it is the scheme returns to step 447. If it is not the scheme has found a feasible solution and returns in step 452. If aserv[job][task] equals 0 in step 425 the scheme proceeds to step 453, which initializes winserv to be 0, winws to be ∞ and winmf to be ∞. The value winws will approximate "wasted space", while the value winmf will be a maximum feasibility fraction, greater than 1 for infeasible solutions and less than or equal to 1 for feasible solution.

Step 454 initializes serv to be 1. Then step 455 checks to see if tok[task][serv] is 1. The case where it is not is deferred for the moment. If it is, step 456 sets rs to be the max(watermark[serv], ctime). Then step 457 sets rf to be rs+etime[job][task][serv]. Step 458 sets ws to be rf−watermark[serv]. Then step 459 checks to see if ws is less than or equal to winws. The case where it is not is deferred for the moment. If it is, step 460 sets mf[0] to be (ptimecon[serv]+max(makespan[job], rf))/T. Then step 461 tests to see if mf[0] is greater than 1. The case where it is is deferred for the moment. If it is not the scheme proceeds to step 462 where serv1 is initialized to 1. Then step 463 checks to see if userv[job][serv] equals 1. If it is, the scheme proceeds to step 464, which sets mf[0] equal to max(mf[0], (ptimecon[serv]+max(makespan[job], rf))/T).

Step 465 checks to see if mf[0] is greater than 1. The case where it is deferred for the moment. Otherwise, the scheme proceeds to step 466, which increments serv1 by 1. Step 466 can also be reached from step 463, if userv[job][serv] is 0. Then step 467 checks to see if serv1 is less than or equal to the number nserv of servers. If it is, the scheme returns to step 463. Otherwise step 468 initializes res to 1. Then step 469 sets mf [res] equal to (prcon[serv][res]+jprcon[job][serv][res]+jtrcon[job][task][res])/prcap[serv][res]. Step 470 checks to see if mf [res] is greater than 1. The case where it is deferred for the moment. Otherwise the scheme increments res by 1 in step 471. Then step 472 checks to see if res is less than or equal to the number nres of resources. If it is the scheme returns to step 469. Otherwise it proceeds to step 473, which tests to see if ws is less than winws. The case where it is not is deferred for the moment. Otherwise step 474 sets winserv equal to serv, winws equal to ws and winnp equal to 0. Then step 475 checks to see if userv[job][serv] is 0. If it is, step 476 sets winnp equal to 1. Then step 477 increments serv by 1. Step 477 can also be reached if the test in step 455 fails, the test in step 459 fails, the test in step 461 succeeds, the test in 465 succeeds, the test in step 475 fails or the test in step 470 succeeds. Then step 478 checks to see if serv is less than or equal to the number nserv of servers. If it is the scheme returns to step 463. The case where it is not is deferred for the moment. If ws is greater than or equal to winws in step 473 the scheme proceeds to step 479, which sets np to be 0. Then step 480 checks to see if userv[job][serv] is 0. If it is, step 481 sets np equal to 1. Then step 482 sets tmf equal to mf [0] and initializes res to be 1. Step 482 can also be reached if userv[job][serv] is 1 in step 480. Then step 483 sets tmf equal to max(tmf, mf [res]) and step 484 increments res by 1.

Step 485 checks to see if res is less than or equal to the number nres of resources. If it is the scheme returns to step 483. Otherwise it proceeds to step 486, which picks a random number u between 0 and 1. The generation of this random number will modify the value of X. Then step 487 checks to see if u is less than or equal to ranpick. This test will guide the order of the two subsequent checks. So if the test in step 487 succeeds, step 488 tests to see if np equals 1 and winnp equals 0. If it is not, step 489 checks to see if np equals 0 and winnp equals 1. If it is not, step 490 checks to see if tmf is less than winmf. If the test in step 487 fails, step 491 checks to see if tmf is less than winmf. If not, step 492 checks to see if tmf equals winmf. If it is step 493 checks to see if np equals 0 and winnp is 1.

Now the cases of success in step 488, failure in step 490 and failure in step 493 represent a failure for this server, and the scheme returns to step 477. The cases of success in step 489, success in step 490, success in step 491 and failure in step 492 represent a current success for this server, and the scheme returns to step 474. If serv is greater than nserv in step 478, step 494 checks to see if winserv is equal to 0. If it is not the scheme returns to step 427. Otherwise step 495 checks to see if dojob[job] is 1. If it is, no feasible solution can be found, and the scheme returns in step 496. Otherwise a relaxed solution is attempted, and step 497 sets winms equal to ∞ and wintmf equal to ∞. Then step 498 initializes serv to be 1. Then step 499 checks to see if tok[task][serv] equals 1. The case where it is not is deferred for the moment. If it is, step 4100 sets rs equal to max(makespan[job],ctime) and step 4101 sets rf equal to rs+etime[job][task][serv]. Then step 4102 sets ws equal to rf−makespan[job] and step 4103 sets tmf equal to (ptimecon[serv]+max(makespan[job],rf))/T. Then step 4104 initializes serv1 to be 1. In step 4105 a check is made to see if userv[job][serv1] equals 1. If it is, step 4106 sets tmf equal to max(tmf, (ptimecon[serv1]+max(makespan[job], rf))/T. Then step 4107 increments serv1 by 1. Step 4107 can also be reached from step 4105 if userv[job][serv1] equals 0. Then step 4108 checks to see if serv1 is less than or equal to the number nserv of servers. If it is the scheme returns to step 4105. If not, the scheme proceeds to step 4109, which initializes res to be 1.

Then step 4110 sets tmf equal to prcon[serv][res]+jprcon[job][serv][res]+jtrcon[job][task][res]/prcap[serv][res].

Step 4111 increments res by 1 and step 4112 tests to see if res is less than or equal to the number nres of resources. If it is the scheme returns to step 4110. Otherwise it proceeds to step 4113, which checks if tmf is less than or equal to wintmf. If it is, step 4114 checks to see if tmf equals wintmf and ws is less than winws. If the test in step 4113 or step 4114 succeeds the scheme sets winserv equal to serv, winws equal to ws and wintmf equal to tmf. It then proceeds to step 4116, which can also be reached if the test in step 499 fails, the test in step 4113 succeeds or the test in step 4114 succeeds. Step 4116 increments serv by 1. Then step 4117 checks to see if serv is less than or equal to the number nserv of servers. If it is, the scheme returns to step 4105. Otherwise it proceeds to step 4118, which checks to see if winserv equals 0. If not, there is a relaxed feasible solution, and the scheme returns to step 427. The case where winserv equals 0 represents failure to find even a relaxed feasible solution, and the scheme returns in step 4119.

The preferred objective function estimation scheme used by Phase 1 will now be described with reference to FIG. 5. The preferred scheme starts in step 501 by setting the value of profit to 0. Step 502 initializes job to be 1. Step 503 initializes done[job] to be 0. Step 504 increments job by 1. Then step 505 checks to see if job is less than or equal to the number njobs of jobs. If it is the scheme returns to step 503. Otherwise the scheme proceeds to step 506 where serv is initialized to 1. Then step 507 initializes res to 1. In step 508 the resource prcon[serv][res] is initialized to 0.

Step 509 increments res by 1. Then step 510 checks to see if res is less than or equal to the number nres of resources. If it is the scheme returns to step 508. Otherwise the scheme proceeds to step 511, where serv is incremented by 1. In step 512 the scheme checks to see if serv is less than or equal to the number nserv of servers. If it is the scheme returns to step 507. Otherwise the scheme proceeds to step 513, which checks if the number nrjobs of required jobs is greater than 0. The case where there are no required jobs is deferred for the moment. If there are required jobs step 514 initializes rjob to 1. Then step 515 initializes s to 0. In step 516 job is initialized to 1.

Step 517 checks to see if dojob[job] is 1. If it is, the job is required, and step 518 increments s by 1. Then step 519 checks if s equals rjob. If it is not, step 520 increments job by 1 and returns to step 517. Step 520 is also reached if dojob[job] is 0 in step 517. If s equals rjob in step 519, step 521 invokes a best time scheme for job. Those skilled in the art will recognize that this scheme will examine all meaningful start times which fit in the change window for the one which minimizes the value loss[job]. Then step 522 sets done[job] to be 1 and increments profit by gain[job]−loss[job]. Step 523 increments rjob by 1 and step 524 checks to see if rjob is less than or equal to the number nrjobs of required jobs. If it is the scheme returns to step 515. Otherwise it proceeds to step 525.

Step 525 checks if the number nojobs of optional jobs is greater than 0. The case where there are no optional jobs is deferred for the moment. Step 525 is also reached from step 513 if there are no required jobs. If there are optional jobs in step 525, step 526 initializes ojob ojobs to be 1. Then step 527 initializes s to be 0. Step 528 initializes job to be 1. Step 529 checks to see if dojob[job] is 0. If it is not step 530 increments s by 1 and step 531 checks to see if s equals ojob. If it is not step 532 increments job by 1. Step 532 can also be reached from step 529 if dojob is 0. Then step 533 invokes a best time scheme for job.

In step 534 it is checked to see if gain[job]−loss[job] is greater than or equal to 0. If it is, the optional job is profitable, and step 535 checks if constraint[job] is 1. If it is, step 536 sets done[job] to be 1 and increments profit by gain[job]−loss[job]. Then step 537 increments ojob by 1. This step can also be reached if step 534 finds the job to be unprofitable. Then step 538 checks if ojob is less than or equal to the number nojobs of optional jobs. If it is, the scheme returns to step 527. If step 535 finds constraint[job] equal to 0 then step 539 sets done[job] equal to −1. Then the scheme returns to step 537. If step 538 finds that ojob equals nojobs the scheme proceeds to step 540, which initializes maxnf to be 1. This variable will check for infeasibilities. Step 540 can also be reached if there are no optional jobs in step 525. Then step 541 initializes serv to be 1.

Step 542 sets frac to be ptimecon[serv]/T, the time consumed on server serv divided by the total change window time. Then step 543 checks to see if frac is greater than maxnf. If so, step 544 sets maxnf to be frac, winserv to be serv and winres to be 0. The last variable will point to the resource with the worst infeasibility, or 0 if time is the worst infeasibility. Step 545 initializes res to be 1. This step can also be reached from step 543 if frac is less than or equal to maxnf. Then step 546 sets frac to be prcon[serv][res]/prcap[serv][res], the resource consumed divided by the capacity. In step 547 it is checked to see if frac is greater than maxnf. If so, step 548 sets maxnf to be frac, winserv to be serv and winres to be res. Then it proceeds to step 549 which increments res by 1. This step can also be reached from step 547 if frac is less than or equal to maxnf.

Step 550 checks to see if res is less than or equal to the number nres of resources. If it is the scheme returns to step 546. If not, the scheme proceeds to step 551, where serv is incremented by 1. Then step 552 checks to see if serv is less than or equal to the number nserv of servers. If it is the scheme returns to step 542. Otherwise the scheme proceeds to step 553, which checks in the maxnf is greater than 1. If not, the solution is feasible, and the scheme returns at step 554. If so, the solution is not currently feasible, and step 555 sets wintprofit equal to −∞ and initializes exp to be 1. Then step 556 sets tprofit to be profit, tmaxnf to be maxnf, twinserv to be winserv and twinres to be winres. Then step 557 initializes job to be 1.

Step 558 sets tdone[job] to be done[job]. Then step 559 increments the value of job by 1 and step 560 tests to see if job is less than or equal to the number njobs of jobs. If it is the scheme returns to step 558. Otherwise it proceeds to step 561, where ncands is initialized to 0. Step 562 initializes job to be 1 and step 563 checks to see if dojob[job] is 0 and tdone[job] is 1. If so, step 564 checks to see if twinres is 0. If it is, step 565 checks to see if makespan[job][twinserv] is greater than 0. Otherwise, step 566 checks to see if jprcon[job][twinserv][twinres] is greater than 0. If the test in either step 565 or 566 succeeds, step 567 increments ncand by 1 and sets cand[job] equal to 1. If the test in either step 565 or 566 fails, step 568 sets cand[job] equal to 0. Then both step 567 and 568 proceed to step 569, which increments job by 1. This step can also be reached from step 563 if that test fails.

Step 570 tests to see if job is less than or equal to the number njobs of jobs. If it is the scheme returns to step 563. Otherwise the scheme proceeds to step 571, which picks a random integer r between 1 and ncands. The generation of this random number will modify the value of X. Then step 572 initializes s to be 0 and step 573 initializes job to be 1. Step 574 tests to see if dojob[job] is 1, tdone[job] is 1 and cand[job] is 1. If this test succeeds step 575 increments s by 1. Then step 576 checks to see if s equals r. If not, step 577 increments job by 1. This step can also be reached from step 574 if the test fails. Then the scheme proceeds to step 574. If s equals r in step 576 the scheme proceeds to step 578, which sets tdone[job] equal to 0 and decrements profit by gain[job]−loss[job].

Step 579 initializes serv to be 1. In step 580 ptimecon[serv] is decremented by makespan[job][serv]. Step 581 initializes res to be 1. In step 582 prcon[serv][res] is decremented by jprcon[job][serv][res]. In step 583 res is incremented by 1 and in step 584 it is checked to see if res is less than or equal to the number nres of resources. If so, the scheme returns to step 582. Otherwise step 585 increments serv by 1. Then step 586 checks to see if serv is less than or equal to the number nserv of servers. If so the scheme returns to step 580. Otherwise it proceeds to step 587, which initializes tmaxnf to be 1.

Step 588 initializes serv to be 1. Step 589 sets frac to be ptimecon[serv]/T, the time consumed on server serv divided by the total change window time. Then step 590 checks to see if frac is greater than tmaxnf. If so, step 591 sets tmaxnf to be frac, winserv to be serv and winres to be 0. The last variable will point to the resource with the worst infeasibility, or 0 if time is the worst infeasibility. Step 592 initializes res to be 1. This step can also be reached from step 590 if frac is less than or equal to tmaxnf. Then step 593 sets frac to be prcon[serv][res]/prcap[serv][res], the resource consumed divided by the capacity. In step 594 it is checked to see if frac is greater than maxnf. If so, step 595 sets tmaxnf to be frac, winserv to be serv and winres to be res. Then it proceeds to step 596 which increments res by 1. This step can also be reached from step 594 if frac is less than or equal to tmaxnf.

Step 597 checks to see if res is less than or equal to the number nres of resources. If it is the scheme returns to step 593. If not, the scheme proceeds to step 598, where serv is incremented by 1. Then step 599 checks to see if serv is less than or equal to the number nserv of servers. If it is the scheme returns to step 589. Otherwise the scheme proceeds to step 5100, which checks in the tmaxnf is greater than 1. If it is the scheme returns to step 561. Otherwise step 5101 tests to see if tprofit is greater than wintprofit. The case where it is not is deferred for the moment. If it is, the experiment is a success, and the step 5102 sets wintprofit equal to tprofit. Then step 5103 initializes job to be 1 and step 5104 sets ttdone[job] equal to tdone[job].

In step 5105 job is incremented by 1, and step 5106 tests to see if job is less than or equal to the number njobs of jobs. If so the scheme returns to step 5104. Otherwise step 5107 increments the value of exp by 1. This step can also be reached from step 5101 if tprofit is less than or equal to wintprofit. Then step 5108 tests to see if exp is less than or equal to the number nexpe of estimator experiments. If so the scheme returns to step 556. Otherwise it proceeds with step 5109, which sets profit to be wintprofit. Then step 5110 initializes job to be 1. Step 5111 sets done[job] to be ttdone[job] and step 5112 increments job by 1. Step 5113 checks to see if job is less than or equal to the number njobs of jobs. If so the scheme returns to step 5111. Otherwise it returns in step 5114.

The preferred phase 2 scheme will now be described with reference to FIG. 6. This scheme starts in step 601 by setting the value profit to be 0. In step 602 the value job is initialized to 1. In step 603 the scheme initializes done[job] to be 0 and checked[job] to be 0. The first array will indicate whether the job will be done in this experiment and the second array will indicate whether or not a job has been evaluated thus far. In step 604 the scheme increments the value job by 1. Then step 605 checks to see if job is less than or equal to the number njobs of jobs. If it is the scheme returns to step 603. Otherwise the scheme proceeds to step 606, where the value serv is initialized to 1. In step 607 the value res is initialized to 1. Then in step 608 the value of prcon[serv][res] is initialized to 0. This array will track resource consumption on the servers.

In step 609 the value of res is incremented by 1. Then step 610 checks to see if res is less than or equal to the number nres of resources. If it is the scheme returns to step 608. Otherwise the scheme proceeds to step 611, where the value of serv is incremented by 1. Then step 612 checks to see if serv is less than or equal to the number nserv of servers. If it is the scheme returns to step 607. Otherwise the scheme proceeds to step 613 where it is checked if the number nrjobs of required jobs is positive. The case where there are no required jobs will be deferred for the moment. If there are required jobs step 614 initializes the value rjob to 1. Then step 615 sets jcount equal to nrjobs-rjob+1.

In step 616 a random integer r between 1 and jcount is chosen. The generation of this random number will modify the value of X. Then step 617 initializes the value s to be 0. In step 618 the scheme initializes job to be 1. Then step 619 checks to see if both dojob[job] is 1 and checked[job] is 0. The array dojob is input data. It keeps track of required and optional jobs as a 1 or 0, respectively. If the check in step 619 is positive, step 620 increments the value of s by 1. Then step 621 checks to see if s equals r. If it is not, or if the check in step 619 is negative, step 622 increments the value of job by 1. Then the scheme returns to step 619. If s equals r in step 621 the scheme proceeds to step 623, where checked[job] is set to 1. Then step 624 invokes a best time scheme for job. Those skilled in the art will recognize that this scheme will examine all meaningful start times which fit in the change window amongst the previously assigned jobs for the one which minimizes the value loss [job]. If the job cannot fit this scheme will set fits[job] to be 0. Otherwise it will be set to 1. If the job fits but cannot meet the constraints the scheme will set constraint [job] to be 0. Otherwise it will be set to 1.

Step 625 checks the value offits[job]. If fits [job] is 1 the scheme proceeds to step 626, which checks the value of constraint[job]. If constraint[job] is 0, or if fits[job]equals 0 in step 625, the scheme proceeds to step 627, where profit is set to be $-\infty$. This is because no solution has been discovered, even considering only the required jobs. Then step 628 returns to the main scheme, causing the experiment to fail. If constraint[job] equals 1 in step 626 then the scheme proceeds to step 629, where profit is incremented by gain[job]-loss [job] and done [job] is set to 1. Then step 630 increments the value of rjob by 1. Step 631 checks to see if rjob is less than or equal to the number nrjobs of required jobs. If it is the scheme returns to step 615. Otherwise the scheme proceeds to step 632, where it is checked if the number nojobs of optional jobs is positive. This step may also be reached from step 613, if there are no required jobs. The case where there are no optional jobs in step 632 will be deferred for the moment. If there are optional jobs step 633 initializes the value ojob to 1. Then step 634 sets jcount equal to nojobs-ojobs+1.

In step 635 a random integer r between 1 and jcount is chosen. The generation of this random number will modify the value of X. Then step 636 initializes the value s to be 0. In step 637 the scheme initializes job to be 1. Then step 638 checks to see if both dojob[job] is 0 and checked[job] is 0. If the check in step 638 is positive, step 639 increments the value of s by 1. Then step 640 checks to see if s equals r. If it is not, or if the check in step 638 is negative, step 641 increments the value of job by 1. Then the scheme returns to step 638. If s equals r in step 640 the scheme proceeds to step 642, where checked[job] is set to 1.

Step 643 invokes the best time scheme for job. Step 644 checks the value of fits [job]. If it equals 1 step 645 checks the value of constraint[job]. If it equals 1 step 646 increments profit by gain[job]-loss[job] and done[job] is set to 1. If either fits[job] or constraint[job] is found equal to 0 in steps 644 or 645, step 617 sets done[job] to be 0. After either step 646 or 647 the scheme increments the value of ojob by 1 in step 648. Then step 649 checks to see if ojob is less than or equal to the number nojobs of optional jobs. If it is the scheme returns to step 634. Otherwise the objective function improvement scheme is invoked in step 650. This scheme attempts to further improve the value of profit. Then in step 651 phase 2 returns to the main scheme.

The preferred objective function improvement scheme utilized in phase 2 will now be described with reference to FIG. 7. This scheme starts in step 701 by initializing winprofit to be profit and mjobs to be 0. The latter counts the number of jobs that are not contiguous with other jobs at the start of the job, the finish of the job, or both. These are the "movable" jobs. Then step 702 initializes job to be 1. Step 703 checks to see if done [job] is 1. If it is, step 704 invokes the check as to whether or not job is movable. It sets mjob[job] to be 1 or 0, according to whether job is movable or not. So step 705 checks mjob[job] to see if it is 1. If it is, step 706 increments mjobs by 1. It then proceeds to step 707, where job is incremented by 1. Step 707 can also be reached if done [job] is 0 in step 703 or if mjob[job] is 0 in step 705. Then step 708 checks to see if job is less than or equal to the number njobs of jobs. If it is, the scheme returns to step 703. Otherwise it proceeds to step 709, where the scheme checks if mjobs is greater than 0. If not, no improvement is possible, and the scheme returns in step 710. Otherwise, step 711 initializes exp to be 1.

Step 712 initializes tprofit to be profit. Step 713 initializes job to be 1, and step 714 checks to see if done[job] is 1. If it is, step 715 sets checked[job] to be 0 and tloss[job] to be loss [job]. Then step 716 increments job by 1. This step can also be reached if done[job] is 0 in step 714. Step 717 checks to see if job is less than or equal to the number njobs of jobs. If it is the scheme returns to step 714. Otherwise it proceeds to step 718, where firsttime is initialized to 1 and imp is initialized to 0. Then step 719 initializes job to be 1.

In step 720 the value rj[job] is initialized to 0. Then step 721 increments job by 1 and step 722 checks to see if job is less than or equal to the number njobs of jobs. If it is the scheme returns to step 720. Otherwise it proceeds to step 723, where rjob is initialized to 1. Step 724 checks to see if firsttime is 1. Since all jobs are in a locally optimal position the objective function improvement scheme treats the first move differently from the others. The first move will involve an increase in the objective function value, while the subsequent moves are required to decrease the value of the objective function. The latter case is deferred for the moment. If firsttime is 1 in step 724, step 725 chooses a random integer job1 between 1 and mjobs. The generation of this random number will modify the value of X. Step 726 initializes job2 to be 0 and step 727 initializes job to be 1.

Then step 728 checks to see if both done[job] is 1 and mjob[job] is 1. If so, step 729 increments job2 by 1 and step 730 tests to see if job1 equals job2. If so, step 731 sets rj[job] to be 1. If not, step 732 increments job by 1 and returns to step 728. Step 732 can also be reached if the test in step 728 fails. After step 731 the scheme proceeds to step 733, where a random start time greater than or equal to the latest job which finishes before job but has a finish time less than or equal to the earliest job which starts after job. The generation of this random number will modify the value of X. The value newloss of the loss if job starts at this time is computed. Step 734 sets firsttime to be 0, tloss[job] to be newloss, and tprofit is set equal to profit-loss [job]+newloss. Then step 735 increments the value of rjob by 1 and step 736 tests to see if rjob is less than or equal to the number djobs of jobs that are done. If it is the scheme returns to step 724. Otherwise it proceeds to step 737, which tests to see if imp is 1. If it is the scheme returns to step 723. The case where imp is 0 is deferred for the moment. If step 724 finds that firsttime is 0, step 738 checks to see if checked[job] is 1. If it is, the scheme returns to step 735. If not, step 739 picks a random integer job1 between 1 and djobs-rjob+1.

Step 740 then initializes job2 to be 0 and step 741 initializes job to be 1. In step 742 a check is made as to whether both done[job] is 1 and rj[job] is 0. If it is job2 is incremented by 1 in step 743. Then step 744 checks to see if job1 equals job2. If so, step 745 sets rj[job] equal to 1. Otherwise, step 746 increments the value of job by 1 and returns to step 742. Step 746 can also be reached from step 742 and from step 744, in both cases if the test fails. After step 745 the scheme proceeds to step 747, which finds the best loss bestloss for job with a revised start time which is greater than or equal to the latest job which finishes before job but has a finish time less than or equal to the earliest job which starts after job.

Step 748 tests whether tloss[job] is greater than bestloss. If it is, step 749 sets imp to be 1, and increments tprofit by tloss[job]-bestloss. Then step 750 sets tloss[job] to be bestloss. Step 751 initializes the value job1 to be 1 and step 752 checks to see if done[job1] is 1. If it is, step 753 checks to see if job equals job1. If so, step 754 sets checked[job1] to be 1. If not, step 755 sets checked[job1] to be 0. Then, in either case, step 756 increments job1 by 1. Step 756 can also be reached from step 752 if done [job] equals 0. Step 757 checks to see if job1 is less than or equal to the number njobs of jobs. If not the scheme returns to step 735. Otherwise the scheme returns to step 752. If tloss is less than or equal to bestloss in step 748, step 758 sets checked[job] equal to 1 and the scheme returns to step 735.

If imp equals 0 in step 737, the scheme proceeds with step 759, which tests to see if tprofit is greater than winprofit. If it is, step 760 sets winprofit equal to tprofit and step 761 initializes job to be 1. Then step 762 tests to see if done [job] is 1. If it is, step 763 sets loss[job] equal to tloss[job] and step 764 increments job by 1. Step 764 can also be reached from step 762 if done [job] is 0. Step 765 checks to see if job is less than or equal to the number njobs of jobs. If it is the scheme returns to step 762. Otherwise it proceeds to step 766, which increments the value of exp by 1. Then step 767 checks to see if exp is less than or equal to the number nexpsi of objective function improvement experiments. If it is the scheme returns to step 712. Otherwise step 768 sets profit equal to winprofit and returns in step 769.

It is to be understood that the present invention, in accordance with at least one presently preferred embodiment, the present invention includes an arrangement for deciding whether or not an RFC should be done; an arrangement for assigning individual tasks to acceptable servers for each RFC to be done; and an arrangement for assigning the start times to said individual tasks for each RFC to be done. Together, these may be implemented on at least one general-purpose computer running suitable software programs. These may also be implemented on at least one Integrated Circuit or part of at least one Integrated Circuit. Thus, it is to be understood that the invention may be implemented in hardware, software, or a combination of both.

If not otherwise stated herein, it is to be assumed that all patents, patent applications, patent publications and other publications (including web-based publications) mentioned and cited herein are hereby fully incorporated by reference herein as if set forth in their entirety herein.

Although illustrative embodiments of the present invention have been described with reference to the accompanying drawings, it is to be understood that the invention is not limited to those precise embodiments, and that various other changes and modifications may be affected therein by one skilled in the art without departing from the scope or spirit of the invention.

What is claimed is:

1. A method for planning and scheduling tasks within a plurality of requests for change within a change window in a computing system comprising the steps of:
 deciding whether or not a request for change should be done with respect to maximizing a profit value expressed as a value of performing the plurality of requests for change minus a value of associated costs, wherein a request for change comprises a set of tasks interrelated by temporal and location-specific dependencies;
 for each request for change to be done, assigning individual tasks within each request for change to acceptable servers;
 for each request for change to be done, assigning a start time to said individual tasks;
 wherein the set of tasks comprises hardware changes and/ or software changes;
 wherein the change window describes a period of time during which a request for change is to be done;
 wherein precedence constraints among tasks within a request for change are enforced;

wherein each task of a request for change that is performed is assigned to a single acceptable server; and wherein no acceptable server can work on more than one task at any time.

2. The method of claim 1, further comprising the step of reserving all servers involved for a duration that begins at the start of a first task and ends at the finish of a last task for each request for change that should be done.

3. The method of claim 1 further comprising the step of maximizing the number of requests for change done.

4. The method of claim 1 further comprising the step of minimizing total downtime.

5. The method of claim 1 further comprising the step of minimizing at least one cost associated with downtime.

6. The method of claim 1 further comprising the step of minimizing a total execution time in implementing a task.

7. The method of claim 1 further comprising the step of maximizing the number of requests for change meeting their deadlines.

8. The method of claim 1 further comprising the step of minimizing multiple deadline penalties associated with requests for change and/or their respective tasks.

9. The method of claim 1 further comprising the step of minimizing an average response time of each request for change.

10. The method of claim 1 further comprising the step of minimizing a weighted average response time of each request for change.

11. A system for planning and scheduling tasks within a plurality of requests for change within a change window in a computing system comprising:

a processor;

an arrangement for deciding whether or not a request for change should be done with respect to maximizing a profit value expressed as a value of performing the plurality of requests for change minus a value of associated costs, wherein a request for change comprises a set of tasks interrelated by temporal and location-specific dependencies;

an arrangement for assigning individual tasks to acceptable servers for each request for change to be done; and an arrangement for assigning a start time to said individual tasks for each request for change to be done;

wherein the set of tasks comprises hardware changes and/or software changes;

wherein the change window describes a period of time during which a request for change is to be done;

wherein precedence constraints among tasks within a request for change are enforced;

wherein each task of a request for change that is performed is assigned to a single acceptable server; and wherein no acceptable server can work on more than one task at any time.

12. The system of claim 11, further comprising an arrangement for reserving all the servers involved for a duration that begins at the start of the first task and ends at the finish of the last task for each request for change that should be done.

13. The system of claim 11, further comprising an arrangement for maximizing the number of requests for change done.

14. The system of claim 11, further comprising an arrangement for minimizing total downtime.

15. The system of claim 11, further comprising an arrangement for minimizing at least one cost associated with downtime.

16. The system of claim 11, further comprising an arrangement for minimizing a total execution time in implementing a task.

17. The system of claim 11, further comprising an arrangement for maximizing the number of requests for change meeting their deadlines.

18. The system of claim 11, further comprising an arrangement for minimizing multiple deadline penalties associated with requests for change and/or their respective tasks.

19. The system of claim 11, further comprising an arrangement for minimizing an average response time of each request for change.

20. The system of claim 11, further comprising an arrangement for minimizing a weighted average response time of each request for change.

21. A program storage device readable by machine, tangibly embodying a program of instructions executable by the machine to perform a method for planning and scheduling tasks within a plurality of requests for change within a change window in a computing system comprising the steps of:

deciding whether or not a request for change should be done with respect to maximizing a profit value expressed as a value of performing the plurality of requests for change minus a value of associated costs, wherein a request for change comprises a set of tasks interrelated by temporal and location-specific dependencies;

for each request for change to be done, assigning individual tasks within each request for change to acceptable servers;

for each request for change to be done, assigning a start time to said individual tasks;

wherein the set of tasks comprises hardware changes and/or software changes;

wherein the change window describes a period of time during which a request for change is to be done;

wherein precedence constraints among tasks within a request for change are enforced;

wherein each task of a request for change that is performed is assigned to a single acceptable server; and wherein no acceptable server can work on more than one task at any time.

22. The program storage device according to claim 21, wherein:

start-to-finish constraints between tasks of a request for change are enforced;

finish-to-finish constraints between tasks of a request for change are enforced;

colocation task/server assignment constraints are enforced for all requests for change;

exlocation task/server assignment constraints are enforced for all requests for change;

resource capacity constraints are enforced on each acceptable server executing one or more tasks for one or more requests for change;

requests for change with a deadline that falls within the change window must be performed;

all tasks of all requests for change that are performed must be performed during the change window.

23. The method according to claim 1, wherein:

start-to-finish constraints between tasks of a request for change are enforced;

finish-to-finish constraints between tasks of a request for change are enforced;

colocation task/server assignment constraints are enforced for all requests for change;

exlocation task/server assignment constraints are enforced for all requests for change;

resource capacity constraints are enforced on each acceptable server executing one or more tasks for one or more requests for change;

requests for change with a deadline that falls within the change window must be performed;

all tasks of all requests for change that are performed must be performed during the change window.

* * * * *